(12) United States Patent
Aramaki et al.

(10) Patent No.: US 8,396,036 B2
(45) Date of Patent: Mar. 12, 2013

(54) HANDOVER PROCESSING METHOD, AND ACCESS POINT AND MOBILE TERMINAL FOR USE IN THE METHOD

(75) Inventors: Takashi Aramaki, Osaka (JP); Tetsuro Morimoto, Kanagawa (JP); Jun Hirano, Kanagawa (JP); Kilian Weniger, Frankfurt (DE)

(73) Assignee: Panasonic Corporation, Osaka (JP)

( * ) Notice: Subject to any disclaimer, the term of this patent is extended or adjusted under 35 U.S.C. 154(b) by 839 days.

(21) Appl. No.: 12/439,122

(22) PCT Filed: Oct. 12, 2007

(86) PCT No.: PCT/JP2007/070005
§ 371 (c)(1),
(2), (4) Date: Mar. 6, 2009

(87) PCT Pub. No.: WO2008/044775
PCT Pub. Date: Apr. 17, 2008

(65) Prior Publication Data
US 2009/0268691 A1    Oct. 29, 2009

(30) Foreign Application Priority Data

Oct. 13, 2006  (JP) ................................. 2006-280283
Jan. 12, 2007  (JP) ................................. 2007-004792
Sep. 27, 2007  (JP) ................................. 2007-251986

(51) Int. Cl.
*H04W 4/00* (2009.01)
(52) U.S. Cl. ........................................ 370/331; 370/469
(58) Field of Classification Search .................. 370/469, 370/331
See application file for complete search history.

(56) References Cited

U.S. PATENT DOCUMENTS

| | | | |
|---|---|---|---|
| 2002/0090966 A1* | 7/2002 | Hansen et al. | 455/522 |
| 2002/0131386 A1 | 9/2002 | Gwon | |
| 2004/0137902 A1 | 7/2004 | Chaskar | |
| 2005/0026655 A1* | 2/2005 | Giaimo et al. | 455/557 |

(Continued)

FOREIGN PATENT DOCUMENTS

| | | |
|---|---|---|
| JP | 2002-335553 | 11/2002 |
| JP | 2005-167388 | 6/2005 |

(Continued)

OTHER PUBLICATIONS

International Search Report dated Nov. 6, 2007.

(Continued)

*Primary Examiner* — Sai-Ming Chan
(74) *Attorney, Agent, or Firm* — Dickinson Wright PLLC

(57) ABSTRACT

A technology is disclosed for providing a handover processing method, and an access point and a mobile terminal used in the method, in which the handover processing method can prevent processing of a HO in a layer 2 and an HO in a layer 3 from occurring at same time simultaneously, and shorten waiting time caused by the HO. The technology includes a step of providing, by the access point, strength information held by the access point itself, the strength information that is information whether to promote a handover processing in the layer 3 or not to promote the handover processing in the layer 3, and a step of receiving, by the mobile node, the provided strength information, deciding whether to perform the handover in the layer 3 based on the received strength information, and performing the handover processing in the layer 3 based on the decision.

22 Claims, 21 Drawing Sheets

U.S. PATENT DOCUMENTS

| | | | | |
|---|---|---|---|---|
| 2006/0291426 | A1* | 12/2006 | Park et al. | 370/331 |
| 2007/0047492 | A1* | 3/2007 | Kim et al. | 370/331 |
| 2008/0285500 | A1* | 11/2008 | Zhang et al. | 370/315 |

FOREIGN PATENT DOCUMENTS

| | | |
|---|---|---|
| JP | 2006-41742 | 2/2006 |

OTHER PUBLICATIONS

R. Hancock, et al., "Next Steps in Signaling (NSIS): Framework," Network Working Group, RFC 4080, Jun. 2005, pp. 1-49. p. 4, line 1.

Chinese Office Action dated May 25, 2011.

* cited by examiner

|  | AR1-RA | AR2-RA | AR3-RA | ... | AR7-RA | CANDIDATE AR |
|---|---|---|---|---|---|---|
| AP1 | s (SAFE) |  |  | ... |  | AR [1] |
| AP2 | s (SAFE) | d (DANGER) | d (DANGER) | ... |  | AR [1] |
| ⋮ | ⋮ | ⋮ | ⋮ | ⋮ | ⋮ | ⋮ |
| AP20 | d (DANGER) | s (SAFE) |  | ... | d (DANGER) | AR [2] |
| ⋮ | ⋮ | ⋮ | ⋮ | ⋮ | ⋮ | ⋮ |

FIG. 23
PRIOR ART
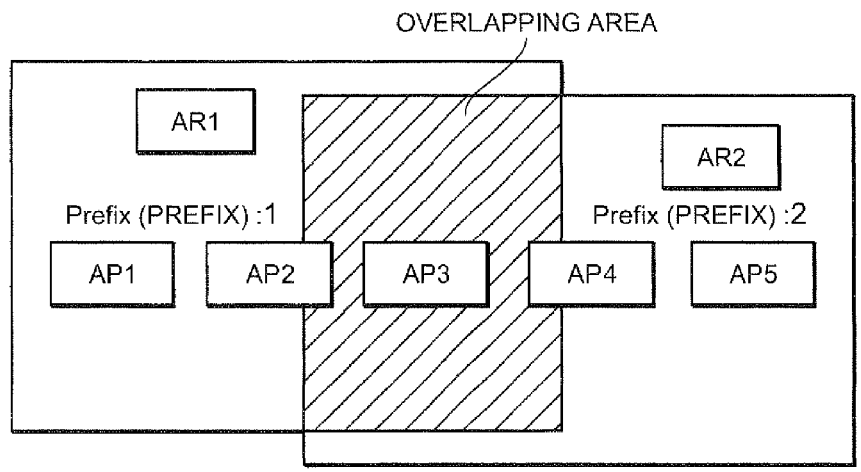
FORTUNATE INSTANCE
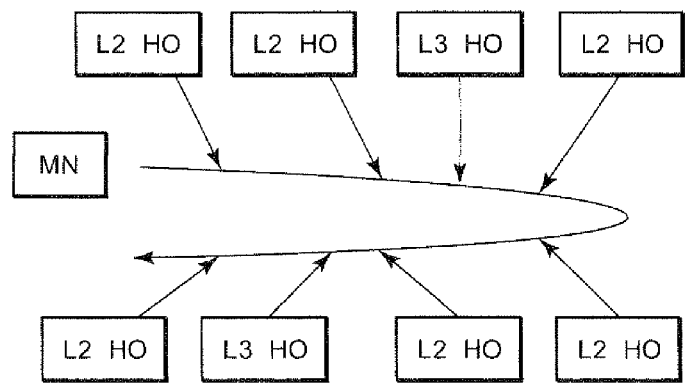
UNFORTUNATE INSTANCE
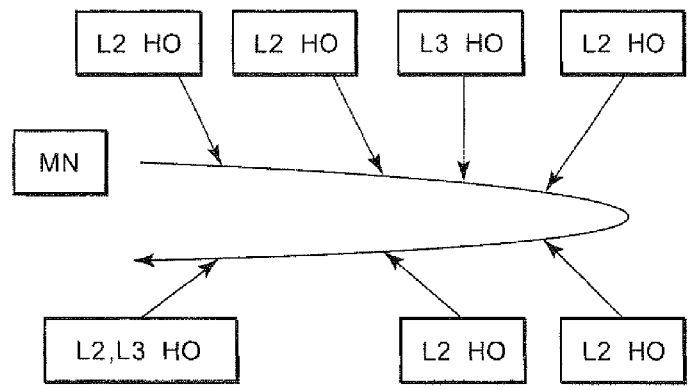

HANDOVER PROCESSING METHOD, AND ACCESS POINT AND MOBILE TERMINAL FOR USE IN THE METHOD

TECHNICAL FIELD

The present invention relates to a handover processing method, and an access point and a mobile terminal used in the method. The handover processing method, and the access point and the mobile terminal used in the method is used when a mobile terminal moves within an area configured by a plurality of access routers each of which provides a subnet and to which access points are connected, the access points providing unique areas in which communication can be performed.

BACKGROUND ART

In recent years, mobile internet protocol (IP) in mobile communication has been widely examined (refer to Patent Document 1, below). Many of today's mobile devices communicate with one another using IP. To provide mobility support for mobile devices, "Mobility Support in IPv6" (refer to Non-patent Document 1, below) is being discussed in the Internet Engineering Task Force [IETF]. Here, movement of a mobile node (MN) between networks will be described using a portion of a conventional communication network configuration shown in FIG. 21. At the moment, the MN is connected to an access point (AP) 1 of an access router (AR) 1 and is moving towards an AP 2 within the AR 1. The AR 1 has a Prefix 1. An AR 2, described hereafter, has a Prefix 2.

As shown in FIG. 21, when the MN performs a handover (HO) from the AP 1 to the AP 2 within the AR 1, the MN performs a HO in a layer 2 (L2). On the other hand, when the MN performs a HO from the AP 2 within the AR 1 to an AP 3 within the AR 2, HO processing in the L2 and a layer 3 (L3) occurs. In other words, when the MN moves between networks having different prefixes, a HO processing in the L2 and a HO processing in the L3 occur. A L1 is not stable during a HO. Because the HO processing is performed in the L2 and in the L3, a long waiting time is required.

There is a well-known resolution method for preventing the HO processing in the L2 and in the L3 from occurring simultaneously. A portion of a network configuration in this method is shown in FIG. 22. As shown in FIG. 22, an area of the AR 1 and an area of the AR 2 overlap such that the HO processing in the L2 and in the L3 does not occur simultaneously. As a result of a configuration such as this, the HO processing in the L2 and the HO processing in the L3 occur separately and independently. The waiting time for the HO is shortened. The HO processing in the L1 does not occur in the overlapping area. Therefore, instantaneous interruption in the L1 stops.

However, in this case, a following problem occurs. When approaching the area configured by the AR 2, the MN begins to see (confirm) the prefix 2 of the AR 2. With this serving as a trigger for the HO in the L3, the MN decides to perform the HO to the Prefix 2 at the AP 3. However, if the MN returns (makes a U-turn) to the AP 2 side immediately after making the decision, the HO processing in the L2 and the HO processing in the L3 occur simultaneously. As described above, this means that the waiting time for the HO increases. Therefore, an increase in the overlapping area between the areas respectively configured by the AR 1 and the AR 2 can be considered. As shown in FIG. 23, as a result of the overlapping area being increased, the HO processing in the L2 and the HO processing in the L3 can be further prevented from occurring simultaneously.

Patent Document 1: Japanese Patent Application Publication No. 2005-167388 (Paragraph 0016)

Non-patent Document 1: R. Hancock, et al., "Next Steps in Signaling: Framework", RFC 4080, June 2005

However, even in this case, because the only trigger for the HO of the MN in the L3 is that the prefix is appeared (confirmed), the HO processing in the L3 may fortunately be completed in time before the HO in the L2 starts. However, the HO processing in the L3 may unfortunately not be completed in time before the HO in the L2 starts. The HO processing in the L2 and the HO processing in the L3 may occur simultaneously.

DISCLOSURE OF THE INVENTION

The present invention has been achieved to solve the above-described problem. An object of the present invention is to provide a handover processing method, and an access point and a mobile terminal used in the method, in which the handover processing method, and the access point and the mobile terminal used in the method can prevent HO processing in a L2 and HO processing in a L3 from being performed simultaneously, and can shorten a waiting time caused by the HO.

To achieve the above-described object, the present invention provides a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node (or peer node) through wireless access with the access point within the communication area, switches connection from an access point with which communication is currently being performed to another access point as a result of movement. The handover processing method includes a step at which the access point provides strength information held by the access point itself. The strength information contains strength on whether to promote a handover processing in a layer 3 or not to promote the handover processing in the layer 3. The handover processing method also includes a step at which the mobile node receives the provided strength information, decides whether to perform a handover in the layer 3 based on the received strength information, and performs the handover processing in the layer 3 based on the decision. As a result of the configuration, processing of a HO in a L2 and a HO in a L3 can be prevented from occurring simultaneously, and waiting time caused by the HO can be shortened.

In addition, in the handover processing method of the present invention, a preferred aspect of the present invention is that the access point provides the strength information in response to a request from the mobile node. As a result of the configuration, the strength information is only provided when required. Therefore, load placed on the access point can be reduced.

In addition, in the handover processing method in the present invention, a preferred aspect of the present invention is that, after the connection to the access point is switched, the mobile node transmits to an access point the strength information at the access point before the switch and prefix information assigned to an access router to which the access point is connected. The access point generates new strength information based on the received strength information and prefix information. As a result of the configuration, the prefix information can be automatically configured.

In addition, in the handover processing method of the present invention, a preferred aspect of the present invention is that a timing at which the strength information and the prefix information are transmitted is indicated by the access router. As a result of the configuration, the prefix information can be appropriately configured.

In addition, in the handover processing method of the present invention, a preferred aspect of the present invention is that the strength information is information set in advance. As a result of the configuration, an amount of work involved with configuring the strength information can be reduced.

The present invention provides a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with the access point within the communication area, switches connection from an access point with which communication is currently being performed to another access point as a result of movement. The handover processing method includes a step at which the mobile node receives a predetermined message transmitted from an external source, decides whether to perform a handover in a layer 3 based on a number of predetermined messages received, and performs handover processing in the layer 3 based on the decision. As a result of the configuration, processing of a HO in a L2 and a HO in a L3 can be prevented from occurring simultaneously, and waiting time caused by the HO can be shortened. Moreover, because a basis for judgment regarding the HO is the number of predetermined messages (such as a router advertisement [RA]) receives, an amount of work involved with setting the strength using a numeric value can be reduced.

The present invention provides a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with the access point within the communication area, switches connection from an access point with which communication is currently being performed to another access point as a result of movement. The handover processing method includes a step at which the mobile node receives a predetermined message transmitted from an external source and, when the received predetermined message Includes a predetermined piece of information, makes an acquisition request to a predetermined server for acquiring strength information serving as a judgment basis for a handover processing in a layer 3. The handover processing method also includes a step at which the predetermined server transmits the strength information to the mobile node in response to the acquisition request. The handover processing method also includes a step at which the mobile node decides whether to perform a handover in the layer 3 based on the strength information, and performs the handover processing in the layer 3 based on the decision. As a result of the configuration, processing of a HO in a L2 and a HO in a L3 can be prevented from occurring simultaneously, and waiting time caused by the HO can be shortened. Moreover, strength information management load placed on the side of transmitting the predetermined message can be reduced.

The present invention provides a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with the access point within the communication area, switches connection from an access point with which communication is currently being performed to another access point as a result of movement. The handover processing method includes a step at which a control terminal controlling the communication network provides strength information that is information promoting a handover processing in a layer 3 or information not promoting the handover processing in the layer 3. The handover processing method also includes a step at which the mobile node receives the provided strength information, decides whether to perform a handover in the layer 3 based on the received strength information, and performs the handover processing in the layer 3 based on the decision. As a result of the configuration, processing of a HO in a L2 and a HO in a L3 can be prevented from occurring simultaneously, and waiting time caused by the HO can be shortened. Moreover, the HO can be controlled by the network end. The information promoting a handover processing in a layer 3 or the information not promoting the handover processing in the layer 3 can respectively be a strength value indicating a dangerous zone or a strength value indicating a safe zone, as described hereafter. Alternatively, the pieces of information can simply give notification of whether the zone is the dangerous zone or the safe zone.

The present invention provides an access point in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with the access point within the communication area, switches connection from an access point with which communication is currently being performed to another access point as a result of movement. The access point includes a storage means for storing therein strength information that is information promoting a handover processing in a layer 3 or information not promoting the handover processing in the layer 3, and an providing means for providing the stored strength information. As a result of the configuration, processing of a HO in a L2 and a HO in a L3 can be prevented from occurring simultaneously, and waiting time caused by the HO can be shortened.

In addition, in the access point of the present invention, a preferred aspect of the present invention is that the providing means provides the strength information in response to a request from the mobile node. As a result of the configuration, the strength information is only provided when required. Therefore, load placed on the access point can be reduced.

In addition, in the access point of the present invention, a preferred aspect of the present invention is that the access point further includes a receiving means for receiving from the mobile node, after the connection to the access point is switched, the strength information at the access point before switching and prefix information assigned to an access router to which the access point is connected, and a generating means for generating new strength information based on the received strength information and prefix information. As a result of the configuration, the prefix information can be automatically configured.

In addition, in the access point of the present invention, a preferred aspect of the present invention is that a timing at which the strength information and the prefix information are transmitted is indicated by the access router. As a result of the configuration, the prefix information can be appropriately configured.

In addition, in the access point of the present invention, a preferred aspect of the present invention is that the strength information is information set in advance. As a result of the configuration, an amount of work involved with configuring the strength information can be reduced.

The present invention provides a mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with the access point within the communication area, switches connection from an access point with which communication is currently being performed to another access point as a result of movement. The mobile node includes a receiving means for receiving strength information provided by the access point and held by the access point. The strength information is information promoting a handover processing in a layer 3 or information not promoting the handover processing in the layer 3. The mobile node also includes a deciding means for deciding whether to perform a handover in the layer 3 based on the received strength information, and a controlling means for performing the handover processing in the layer 3 based on the decision. As a result of the configuration, processing of a HO in a L2 and a HO in a L3 can be prevented from occurring simultaneously, and waiting time caused by the HO can be shortened.

In addition, in the mobile node of the present invention, a preferred aspect of the present invention is that the controlling means requests that the access point provides the strength information. As a result of the configuration, the strength information is only requested when required.

In addition, in the mobile node of the present invention, a preferred aspect of the present invention is that the mobile node also includes a transmitting means for transmitting to the access point, after the connection to the access point is switched, the strength information at the access point before switching and prefix information assigned to an access router to which the access point is connected. As a result of the configuration, the prefix information can be automatically configured.

In addition, in the mobile node of the present invention, a preferred aspect of the present invention is that a timing at which the strength information and the prefix information are transmitted is indicated by the access router. As a result of the configuration, the prefix information can be appropriately configured.

In addition, in the mobile node of the present invention, a preferred aspect of the present invention is that the strength information is set in advance. As a result of the configuration, an amount of work involved with configuring the strength information can be reduced.

The present invention provides a mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with the access point within the communication area, switches connection from an access point with which communication is currently being performed to another access point as a result of movement. The mobile node includes a receiving means for receiving a predetermined message transmitted from an external source, a deciding means for deciding whether to perform a handover in a layer 3, based on a number of predetermined messages received, and a controlling means for performing handover processing in the layer 3 based on the decision. As a result of the configuration, processing of a HO in a L2 and a HO in a L3 can be prevented from occurring simultaneously, and waiting time caused by the HO can be shortened. Moreover, because a basis for judgment regarding the HO is the number of predetermined messages (such as a router advertisement [RA]) receives, an amount of work involved with setting the strength using a numeric value can be reduced.

The present invention provides a mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with the access point within the communication area, switches connection from an access point with which communication is currently being performed to another access point as a result of movement. The mobile node including a receiving means for receiving a predetermined message transmitted from an external source, a transmitting means for, when the received predetermined message includes a predetermined piece of information, making an acquisition request to a predetermined server for acquiring strength information serving as a judgment basis for a handover processing in a layer 3, a deciding means for deciding whether to perform a handover in the layer 3 based on the strength information from the predetermined server, and a controlling means for performing the handover processing in the layer 3 based on the decision. As a result of the configuration, processing of a HO in a L2 and a HO in a L3 can be prevented from occurring simultaneously, and waiting time caused by the HO can be shortened. Moreover, strength information management load placed on the side transmitting the predetermined message can be reduced.

The present invention provides a mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with the access point within the communication area, switches connection from an access point with which communication is currently being performed to another access point as a result of movement. The mobile node including a receiving means that receives strength information provided by a control terminal controlling the communication network. The strength information is information promoting a handover processing in a layer 3 or information not promoting the handover processing in the layer 3. The mobile node also includes a deciding means that decides whether to perform a handover in the layer 3 based on the received strength information, and a controlling means that performs the handover processing in the layer 3 based on the decision. As a result of the configuration, processing of a HO in a L2 and a HO in a L3 can be prevented from occurring simultaneously, and waiting time caused by the HO can be shortened. Moreover, the HO can be controlled by the network end. The information promoting a handover processing in a layer 3 or the information not promoting the handover processing in the layer 3 can respectively be a strength value indicating a dangerous zone or a strength value indicating a safe zone, as described hereafter. Alternatively, the pieces of information can simply give notification of whether the zone is the dangerous zone or the safe zone.

The present invention provides a handover processing method used when, in a communication network configured such that networks with different properties overlap, a mobile node switches connection from a network to which the mobile node currently belongs to another network having different properties as a result of movement. The handover processing method includes a step at which the mobile node receives information from an edge terminal positioned on an edge of the network to which the mobile node currently belongs, the information stating that the edge terminal is positioned at the edge of the network to which the mobile node currently belongs. The handover processing method also includes a step at which the mobile node decides whether to perform a handover based on the received information, and performs processing of the handover based on the decision. As a result of the configuration, waiting time caused by the HO is shortened. Here, the above-described networks with different properties refer to networks with different configurations, management methods, and the like. As described hereafter, the network refers to a wireless local area network (WLAN), a cellular network, and the like. The networks with different properties can also be, for example, different mobility management domains, such as a proxy MIP (PMIP) and a client MIP (CMIP), or different management domains during roaming and the like. The above-described edge terminal is equivalent, for example, to an AP in a WLAN, and a base station (BS) in a cellular network, a management domain, and the like.

The handover method, and the access point and the mobile terminal used in the method according to the present invention are configured as described above. Processing of the HO in the L2 and the HO in the L3 can be prevented from occurring simultaneously, and waiting time caused by the HO can be shortened.

BRIEF DESCRIPTION OF THE DRAWINGS

FIG. 23 is a diagram of a portion of a configuration of another conventional communication network.

BEST MODE FOR CARRYING OUT THE INVENTION

First Embodiment

Figure 1:
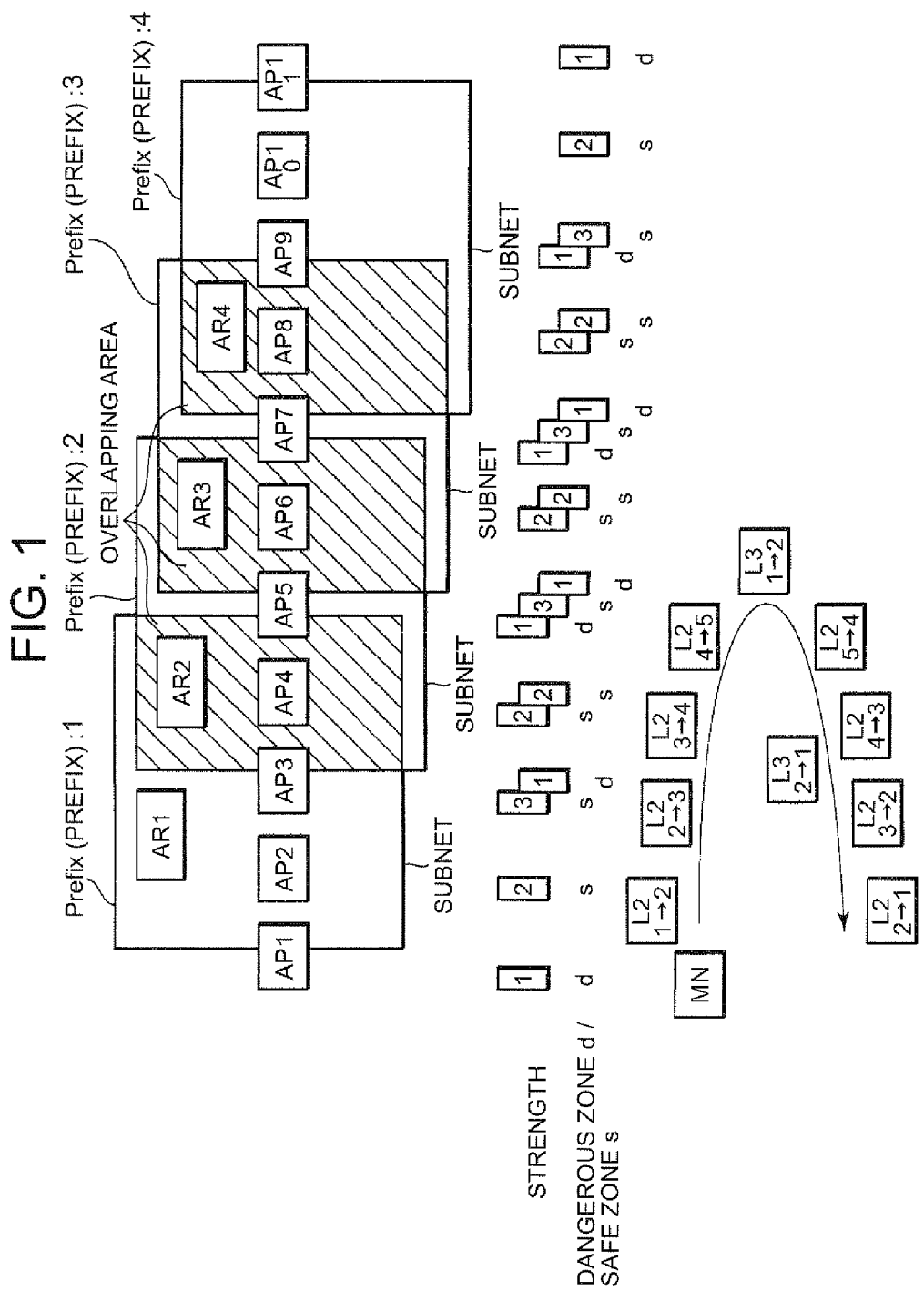
FIG. 1 is a diagram of an example of a portion of a configuration of a communication network according to a first embodiment of the present invention.
Figure 2:
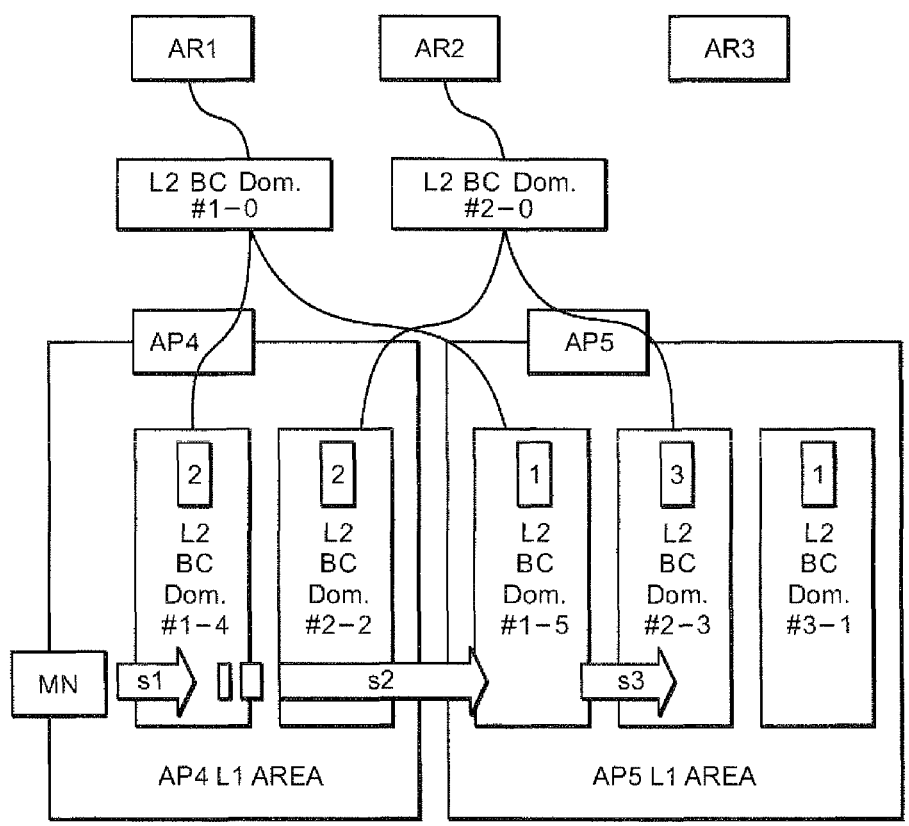
FIG. 2 is a diagram for explaining details of a HO in L2 according to the first embodiment of the present invention.
Figure 3:
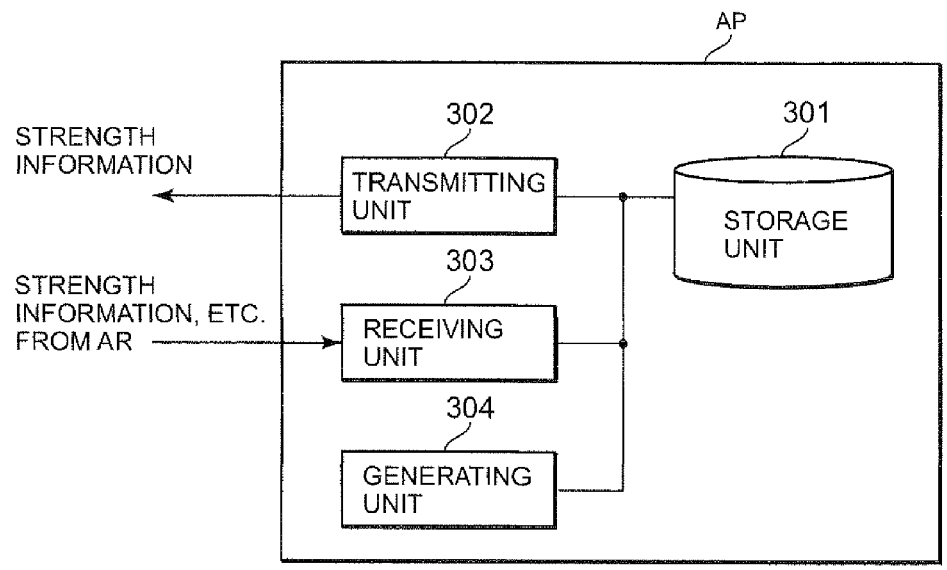
FIG. 3 is a block diagram of an example of a configuration of an AP according to the first embodiment of the present invention.
Figure 4:
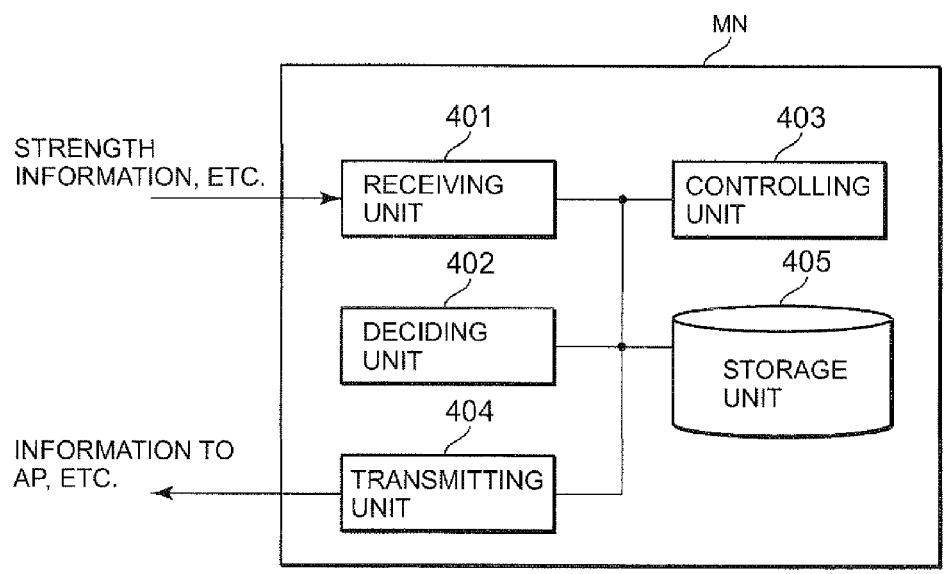
FIG. 4 is a block diagram of an example of a configuration of a MN according to the first embodiment of the present invention.

A first embodiment of the present invention will be described below with reference to FIG. 1 to FIG. 4. FIG. 1 is a diagram of an example of a portion of a configuration of a communication network according to the first embodiment of the present invention. FIG. 2 is a diagram for explaining details of a HO in a L2 according to the first embodiment of the present invention. FIG. 3 is a block diagram of an example of a configuration of an AP according to the first embodiment of the present invention. FIG. 4 is a block diagram of an example of a configuration of a MN according to the first embodiment of the present invention.

First, an example of a portion of a configuration of a communication network according to the first embodiment of the present invention will be described with reference to FIG. 1. As shown in FIG. 1, respective subnets of AR 1 to AR 4 overlap with one another such as to have overlapping areas. A prefix of each AR is respectively Prefixes 1 to 4. APs are present which are connected to respective AR and form unique areas in which communication can be performed. For example, AP 1 to AP 5 are connected to the AR 1, AP 3 to AP 7 are connected to the AR 2, AP 5 to AP 9 are connected to the AR 3, and AP 7 to AP 11 are connected to the AR 4.

In such a configuration, for example, when a MN communicating with a correspondent node (CN) (not shown) via the AP 1 moves from the AP 1 towards the AP 11, the MN connected to the AP 1 performs a HO processing on the AP2 to which the MN connects next. The MN connects to the AP 2 and continues communication with the CN (not shown). Then, when the MN continues moving in this way, the MN performs the HO processing and changes connection destinations to AR 3, AR 4, AR 5, and so forth. The AP 3 and the AP 5 are APs on the edges of the overlapping area of the subnets of the AR 1 and the AR 2.

According to the first embodiment, a value referred to as a signal strength (also referred to, hereinafter, as strength) is used as a basis for judging whether a HO in a L3 is performed. Here, the strength is set, for example, such as to be low at the edge of the subnet of an AR and to increase towards the center of the subnet. A low strength in this instance indicates a high possibility of the HO in the L3 (in other words, a dangerous zone) because it means that would be at the edge of the subnet. A high strength indicates a low possibility of the HO in the L3 (in other words, a safe zone) because it means that would be near the center of the subnet.

As shown in FIG. 1, separation into the dangerous zone (d) and the safe zone (s), described above, is performed based on the value of the strength. It is assumed that the dangerous zone (d) has the value of the strength "1" and the safe zone (s) has the value of the strength "2". The strength can, for example, be added to an RA from the AR and transmitted to the MN. Alternatively, the strength can be provided to the MN by a beacon from the AP. Alternatively, the strength can be provided by the AP in response to a request from the MN. Moreover, the value of the strength is not required to be graded. A value at only the center of the subnet can differ, and values at other areas can be the same.

Here, as shown in FIG. 1, a case that the MN moving from the AP 1 towards the AP 11 turns back towards the AP 1 at the AP 5 (making a U-turn) is described. In this case, only the HO in the L2 is performed when the MN performs the HO from the AP 1 to the AP 2. This is because the AP 2 is in the safe zone (s) in the coverage of the AR 1. When the MN moves to the AP 4 by performing the HO in a similar manner, the MN attempts to perform the HO to the AP 5. At this time, the MN selects (receives) the strength value "3" that is the maximum strength to the Prefix 2, which is different from the Prefix 1. According to the first embodiment, for example, it is configured such that the HO in the L3 is decided to perform when the maximum strength to each prefix is selected. As a result, the MN performs HO processing in the L3. The decision of the HO in the L3 is not limited to that described above. The HO in the L3 can be decided to perform when the strength indicating the safe zone (for example, a strength value "2" to the Prefix 2 at the AP 4) is selected.

Here, when the MN makes the U-turn at the AP 5 and returns towards the AP 1, the MN performs the HO in the L2 to the AP 4, as described above. Then, when the MN moves to the AP 3, the MN attempts to perform the HO to the AP 2. At this time, the MN selects the strength value "3" that is the maximum strength to the Prefix 1. Therefore, as described above, the MN performs the HO processing in the L3. In this way, as a result of the HO in the L2 and the HO in the L3 being separately performed, the waiting time for the HO can be kept short.

Next, details of the above-described HO in the L2 will be described with reference to FIG. 2. FIG. 2 shows a portion of the above-described FIG. 1. In actuality, the HO in the L3 at the AP 5 accompanies the HO in the L2 because of a problem regarding broadcast domain (BC Dom.). However, when the L1 is stable, the waiting time for the HO in the L2 and in the L3 is shorter than that when the L1 is unstable.

Here, an example of a sequence of the HO will be described. As shown in FIG. 2, each of the AP 4 and the AP 5 has an area of the L1. As a result of the MN moving from the AP 4 to the AP 5, first, a L2 BC Dom. for the MN becomes #1-4 of the L2 BC Dom. of the AP 4 in the coverage of the AR 1. This is the case of the HO in the L2 when the L1 is stable (s1). Then, the L2 BC Dom. in the MN changes from #1-4 of the L2 BC Dom. of the AP 4 in the coverage of the AR 1 to #1-5 of the L2 BC Dom. of the AP 5 in the coverage of the AR 1. This is the case of the HO in the L2 when the L1 is unstable (s2). Then, the L2 BC Dom. in the MN changes from #1-5 of the L2 BC Dom. of the AP 5 in the coverage of the AR 1 to #2-3 of the L2 BC Dom. of the AP 5 in the coverage of the AR 2. This is the case of the HO in the L2 and in the L3 when the L1 is stable (s3).

Next, an example of the above-described AP will be described with reference to FIG. 3. As shown in FIG. 3, the AP includes a storage unit 301, a transmitting unit 302, a receiving unit 303, and a generating unit 304. The storage unit 301 associates strength information with the prefix and stores therein the strength information. The strength information is information whether to promote the HO processing in the L3 (the strength value indicating the dangerous zone) or not to promote the HO processing in the L3 (the strength value indicating the safe zone). The strength information can be automatically configured, such as a zone code according to a second embodiment, described hereafter. Alternatively, the strength information can be received from the AR in advance or set in advance.

The transmitting unit 302 transmits the strength information stored in the storage unit 301. In other words, the transmitting unit 302 provides, to the MN connecting to the AP itself, the prefix to which the AP itself belongs and information on the strength at the AP itself. At this time, is the pieces of information can be provided to the MN, for example, by a beacon or in response to a request from the MN.

The receiving unit 303, in addition to receiving the strength information from the AR and information from the MN, functions when the strength information is automatically configured, such as the zone code according to the second embodiment. After the MN performs a handover (after a connection to the access point is changed), the receiving unit 303 receives, from the MN, information on the strength at the AP before the handover and information on the prefix assigned to the AR to which the AP is connected. The generating unit 304 also functions when the strength information is automatically configured, such as the zone code according to the second embodiment. The generating unit 304 generates new information on strength based on the information on the strength and the information on the prefix received by the receiving unit 303 (regarding automatic configuration, refer to the second embodiment).

Next, an example of the above-described MN will be described with reference to FIG. 4. As shown in FIG. 4, the MN includes a receiving unit 401, a deciding unit 402, a controlling unit 403, a transmitting unit 404, and a storage unit 405. The receiving unit 401 receives strength information and the like held by the AP and transmitted by the AP. The strength information is the information whether to promote the HO processing in the L3 (the strength value indicating the dangerous zone) or not to promote the HO processing in the L3 (the strength value indicating the safe zone).

The deciding unit 402 decides whether to perform the HO in the L3 based on the strength information received by the receiving unit 401. Specifically, as described above, the deciding unit 402 decides if the HO in the L3 is performed according to whether the maximum value of the strength is selected (received). The deciding unit 402 can decide to perform the HO processing in the L3 when the strength indicating the sate zone of another prefix is selected. The controlling unit 403 performs the HO processing in the L3 based on the decision made by the deciding unit 402. The controlling unit 403 can also request to the AP to provide the strength information.

The transmitting unit 404, in addition to transmitting information to the AP and the like, functions when the strength information is automatically configured, such as the zone code according to the second embodiment. After the handover of the MN, the transmitting unit 404 transmits to the AP the information on the strength at the AP before the handover and the information on the prefix assigned to the AR to which the AP is connected. The storage unit 405 stores therein received information, such as the information on the prefix and the strength information, and stores information required to control operation of the MN, such as a control program.

Second Embodiment

Figure 5:
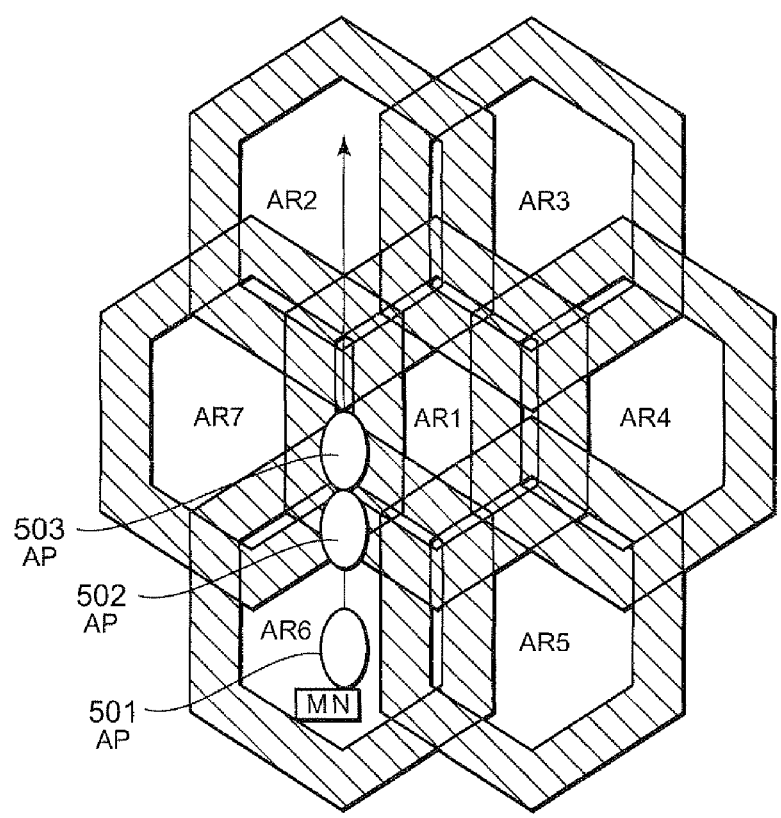
FIG. 5 is a diagram of an example of a portion of a configuration of a communication network according to a second embodiment of the present invention.
Figure 6:
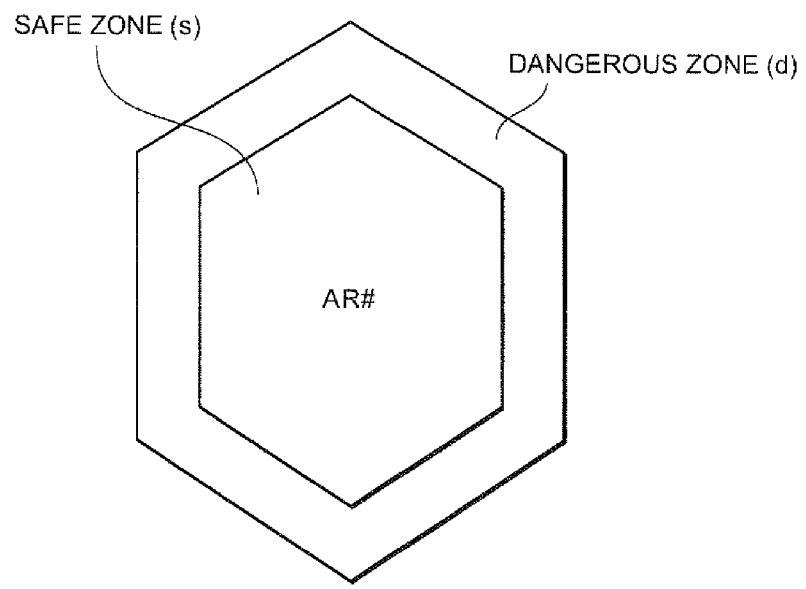
FIG. 6 is a diagram for explaining an example of an AR configuring a communication network according to the second embodiment of the present invention.

Next, a second embodiment of the present invention will be described with reference to FIG. 5 that shows an example of a portion of a configuration of a communication network according to the second embodiment. As shown in FIG. 5, according to the second embodiment, the communication network is configured such that respective hexagonal subnets of AR overlap. Here, an example of an AR configuring the communication network will be described with reference to FIG. 6. As shown in FIG. 6, a subnet of the AR is divided into two types of areas. In other words, the subnet is divided into a dangerous zone (d) which is an area surrounding the subnet of the AR and a safe zone (s) which is the area of the subnet excluding the dangerous zone (d). In the safe zone (s), a HO in the L3 is not required when a HO in the L2 is performed. On the other hand, in the dangerous zone (d), the HO in the L3 may be required when the HO in the L2 is performed.

Figure 7:
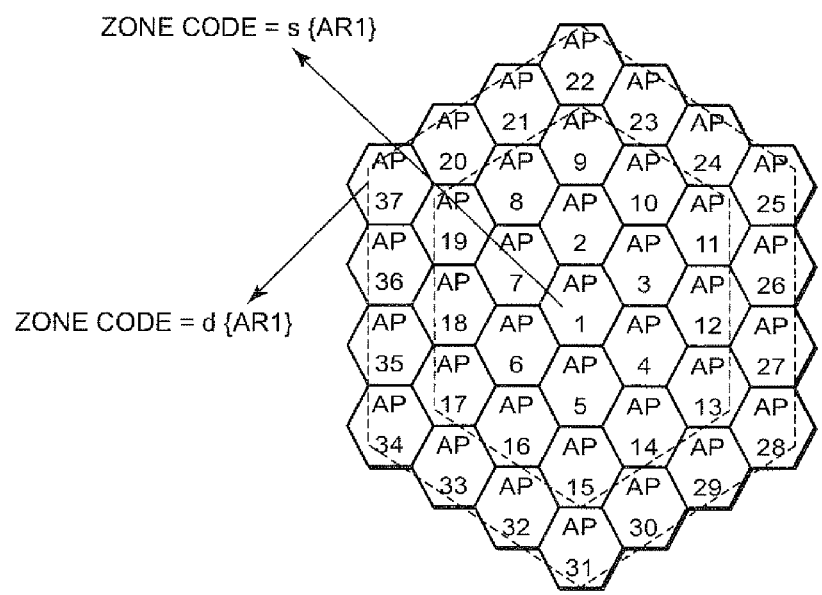
FIG. 7 is a diagram for explaining an example of an arrangement of AP in a subnet of the AR according to the second embodiment of the present invention.

Here, an example of an arrangement of the AP within the subnet of the AR is shown in FIG. 7. As shown in FIG. 7, AP 1 to AP 37 are arranged within the coverage of the AR. The AP 1 to AP 37 respectively form hexagonal unique communication areas. In this example, the AP 1 to AP 19 belong to the above-described safe zone (s). The AP 20 to AP 37 belong to the above-described dangerous zone (d). In a communication network such as this, each AP sends out a beacon including a "zone code". For example, the "zone code" provided by the AP 1 in the coverage of the AR 1 is "zone code=s{AR1}", indicating that the AP 1 is in the safe zone. The "zone code" provided by the AP 37 in the coverage of the AR 1 is "zone code=d{AR1}", indicating that the AP 37 is in the dangerous zone. The "zone code" can be transmitted from the AP in response to a request from the MN. Alternatively, the "zone code" can be set in advance, or set automatically. The case that the "zone code" is set automatically will be described hereafter.

Here, it is described with reference to FIG. 5 about the HO case when the MN moves within a communication network described above. As shown in FIG. 5, when the MN moves from an area of the safe zone of the AR 6 towards the direction of the AR 2 is considered. If the MN can move along the safe zone, unnecessary HO in the L3 can be avoided. The MN starts within the safe zone of the AR 6 (AP 501), and processing starts using an IP address obtained from the AR 6. "Zone code=s{AR6}" is added to a beacon received when the MN is started. The MN moves towards the AR 2 without performing the HO in the L3.

Then, when the MN arrives at an AP 502, the MN receives zone codes s{AR6}, d{AR1} and d{AR7}. Here, because the MN is the area of the safe zone within the AR 6 through which the MN is currently moving, the MN can continue moving without performing the HO in the L3. When the MN arrives at an AP 503, the MN receives zone codes d{AR6}, s{AR1} and s{AR7}. At this time, because the MN has entered an area of the dangerous zone within the coverage of the AR 6 through which the MN is currently moving around, the MN decides to perform the HO in the L3 from the AR 6 to the AR 1 indicating the safe zone, while the MN is connected to the AP 503. The MN can decide to perform the HO in the L3 to the AR 7 indicating a safe zone, as well. In this way, the MN similarly decides whether to perform the HO in the L3 based on the zone codes received when the MN moves.

Figure 8:
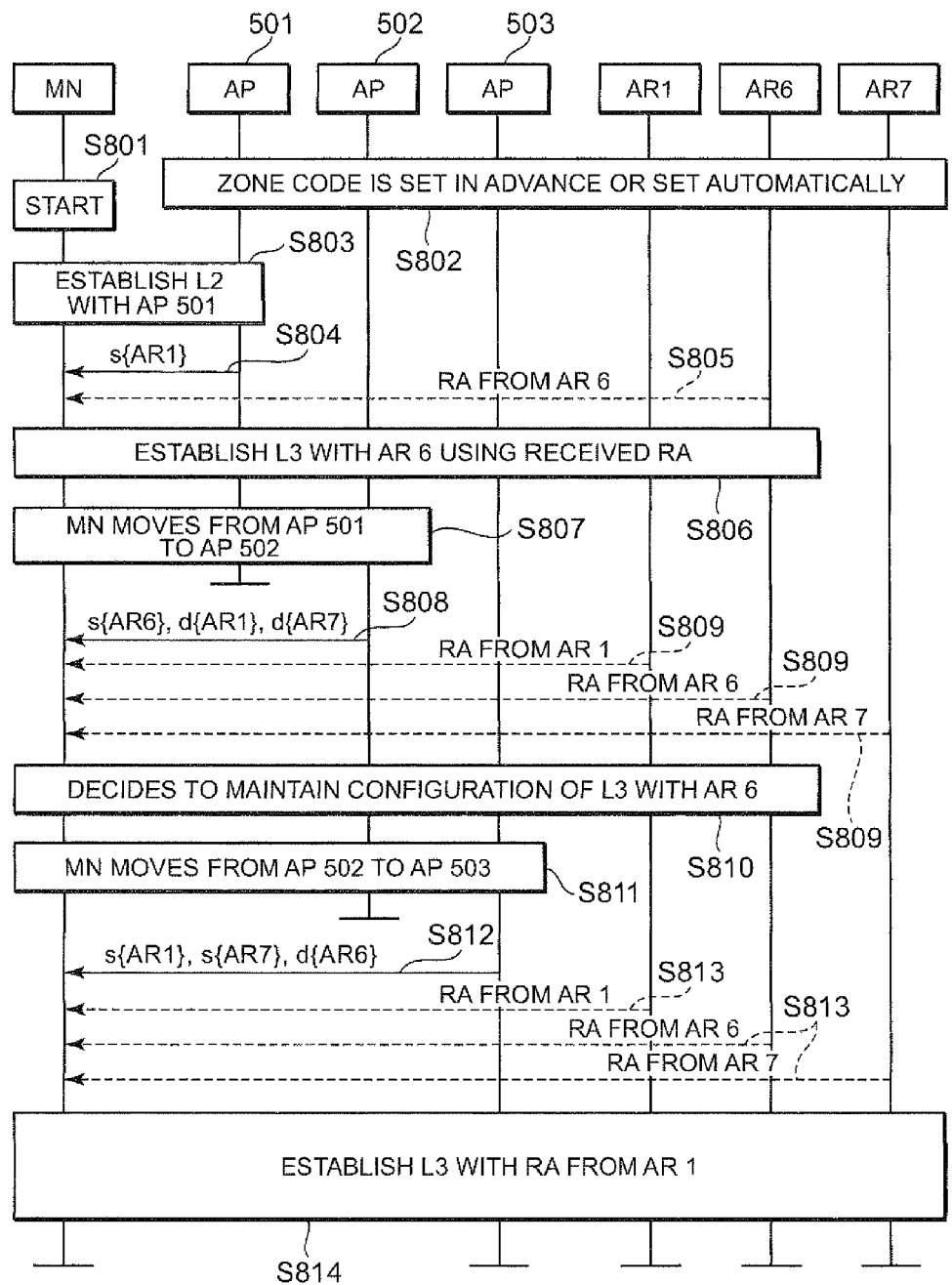
FIG. 8 is a sequence chart of an example of a sequence of an HO processing accompanying movement of a MN according to the second embodiment.

Next, a sequence of a HO processing accompanying the above-described movement of the MN will be described with reference to FIG. 8. As shown in FIG. 8, first, the MN starts within the area (AP 501) of the safe zone in the coverage of the AR 6 (Step S801). In the AP 501, the AP 502, the AP 503, the AR 1, the AR 6 and the AR 7, the zone code is set in advance or set automatically (Step S802). Then, the MN establishes the L2 with the AP 501 (Step S803). When the L2 is established, the MN receives s{AR6} from the AP 501 as the zone code (Step S804). The MN also receives an RA From the AR 6 (Step S805), and establishes the L3 with the AR 6 using the received RA (Step S806).

Then, the MN moves from the AP 501 to the AP 502 (Step S807). The MN receives s{AR6}, d{AR1} and d{AR7} from the AP 502 as the zone codes (Step S808). The MN also receives respective RA from the AR 1, the AR 6 and the AR 7 (Step S809). Because the MN is still in the safe zone in the coverage of the AR 6 at AP 502, the MN decides to maintain the configuration of the L3 with the AR 6 (Step S810).

The MN moves from the AP 502 to the AP 503 (Step S811). The MN receives s{AR1}, s{AR7} and d{AR6} from the AP 503 as the zone codes (Step S812). Then the MN receives respective RA from the AR 1, the AR 6 and the AR7 (Step S813). The MN is in the dangerous zone at the AP 503 in the coverage of the AR 6 and in the safe zone at the AP 503 in the coverage of the AR 1. Therefore, the MN configures the L3 with the RA of AR 1 (Step S814). The MN moves from AR 6 to the AR 1 in the L3 while the wireless communication is continued at the AP 503. Here, the MN selects the AR 1. However, the MN can select the AR 7 because the MN is in the safe zone at the AP 503 in the coverage of the AR 7, as well.

Figures 9A, 9B:
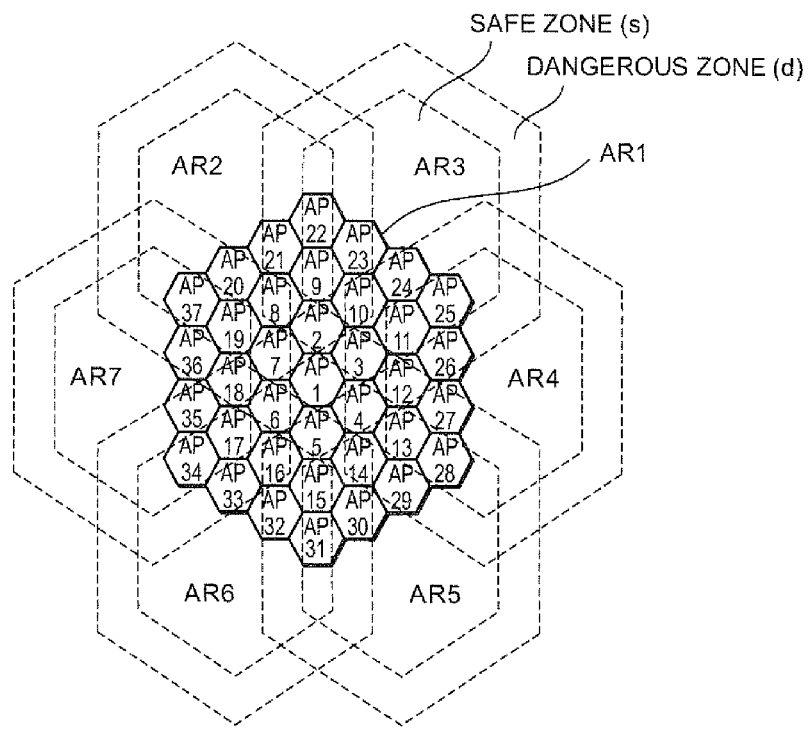
FIG. 9A is a diagram of an example of an arrangement of the AR and an arrangement example of the AP disposed in a safe zone and a dangerous zone in the coverage of the AR according to the second embodiment of the present invention.
FIG. 9B is a diagram of an example of a table indicating whether each AP corresponding to the arrangement in FIG. 9A is in the safe zone or the dangerous zone in each AR, according to the second embodiment of the present invention.

Here, an example of an arrangement of the AR and an arrangement example of the AP disposed in the safe zone and the dangerous zone within the coverage of the AR are shown in FIG. 9A. FIG. 9B is an example of a table showing whether each AP corresponding to the arrangement in FIG. 9A is in the safe zone or the dangerous zone in each coverage of the AR. As shown in FIG. 9B, at the AP 1, the zone is only "s" (safe) in the coverage of the AR 1. At the AP 2, the zone is s(safe) in the coverage of the AR 1, and "d" (danger) in the coverage of the AR 2 and the AR 3. At the AP 20, the zone is "d" (danger) in the coverage of the AR 1 and the AR 7, and "s" (safe) in the coverage of the AR 2. In a "Candidate AR" shown in FIG. 9B, a number of an AR number corresponding to "s" (safe) is shown.

Next, an example of an automatic configuration of the zone code, mentioned above, will be described. The zone code described here is a zone code indicating the safe zone when the strength value, described hereafter, is a predetermined value (for example, a strength value 2) or more. When the strength value is less than the predetermined value, the zone code indicates the dangerous zone. First, a zone code used in the explanation hereafter is defined. RA(n,s) indicates an RA having a strength "s" at a prefix "n". RepRA(p,s) indicates an RA reported by the MN at a previous AP. "t" indicates a considerably lengthy amount of time, and indicates an amount of time until at least a single HO is performed per HO path. Here, an initial strength value is set to 1.

Figure 10:
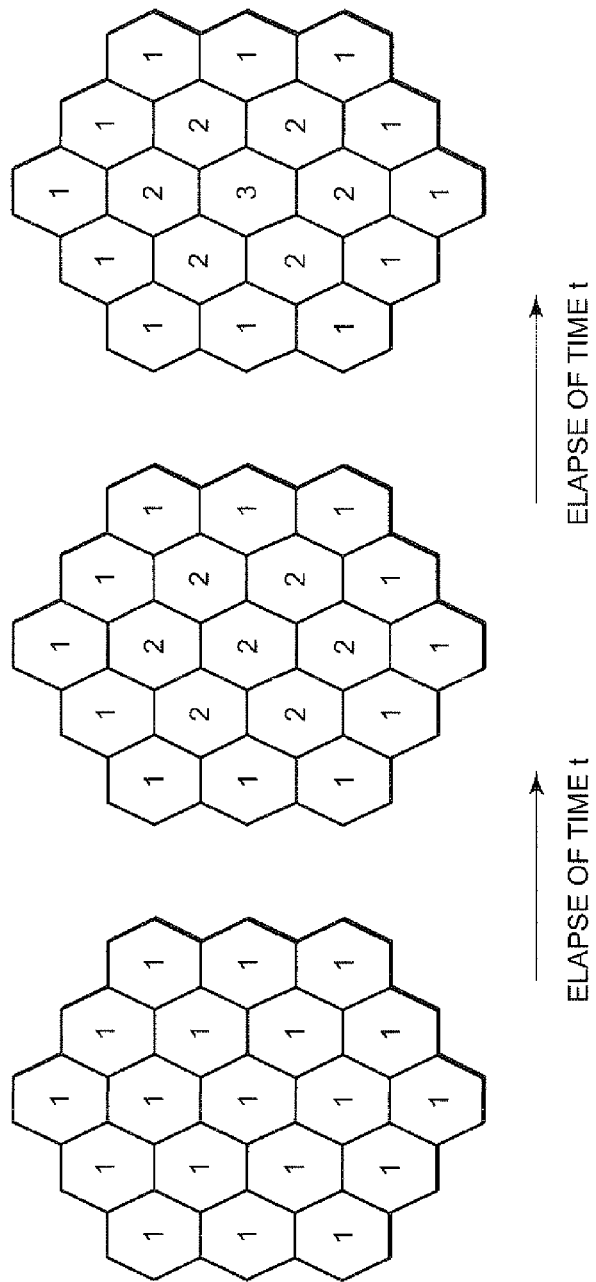
FIG. 10 is an explanatory diagram of an automatic configuration of a zone code according to the second embodiment of the present invention.

Here, in case that p=n in all RepRA(p,s) and "s" in each RepRA(p,s) is greater than the "s" in RA(n,s) or the same, the RA(n,s) is set to the value of a minimum s of the RepRA(p,s) with 1 being added so that the strength will be increased. As a result, for example, the strength at each AP is configured as shown in FIG. 10, and the zone code is automatically configured. Nothing occurs if above mentioned conditions are not fulfilled. It happens under cases where, for example, the RepRA(p,s) does not match the current prefix, the strength of the RepRA(p,s) is stronger or weaker, or the like. Here, "t" can be set by external node such as the AR connected to the AP.

The automatic configuration of the zone code is not limited to that by the above-described algorithm. For example, the zone code can be automatically configured based on a distance between the AR and the AP. Specifically, the zone code is configured based on a round trip time (RTT) and the like.

Next, an example of the AP according to the second embodiment will be described. The AP according to the second embodiment also has similar constituent elements and configuration as those of the AP according to the first embodiment. Therefore, the AP according to the second embodiment will be described with reference to FIG. 3. The AP includes the storage unit 301, the transmitting unit 302, the receiving unit 303, and the generating unit 304. The storage unit 301 associates strength information (zone code) with the prefix and stores therein the strength information. The strength information is information whether to promote the HO processing in the L3 (the strength value indicating the dangerous zone) or not to promote the HO processing in the L3 (the strength value indicating the safe zone). The zone code can be set in advance or automatically configured as described above.

The transmitting unit 302 transmits the zone code stored in the storage unit 301. In other words, the transmitting unit 302 provides the zone code to the MN connecting to the AP itself. At this time, the zone code can be provided to the MN, for example, by a beacon or in response to a request from the MN (by unicast).

The receiving unit 303, in addition to receiving information from the AR, the MN and the like, functions when the zone code is automatically configured. After the MN performs a handover, the receiving unit 303 receives, from the MN, information on the strength at the AP before the handover and information on the prefix assigned to the AR to which the AP is connected. A timing at which the MN transmits the information on the strength and the information on the prefix assigned to the AR to which the AP is connected can be indicated by the AR. The generating unit 304 also functions when the zone code is automatically configured. The generating unit 304 generates new information on strength based on the information on the strength and the information on the prefix received by the receiving unit 303.

Next, an example of the MN according to the second embodiment will be described. The MN according to the second embodiment also has similar constituent elements and configuration as those of the MN according to the first embodiment. Therefore, the MN according to the second embodiment will be described with reference to FIG. 4. The MN includes the receiving unit 401, the deciding unit 402, the controlling unit 403, the transmitting unit 404, and the storage unit 405. The receiving unit 401 receives the zone code held by the AP and transmitted by the AP. The zone code is the information whether to promote the HO processing in the L3 (the zone code indicating the dangerous zone) or not to promote the HO processing in the L3 (the zone code indicating the safe zone).

The deciding unit 402 decides whether to perform the HO in the L3 based on the zone code received by the receiving unit 401. Specifically, the deciding unit 402 decides whether to perform the HO in the L3 based on whether the zone code is that indicating the safe zone or that indicating the dangerous zone. The controlling unit 403 performs the HO processing in the L3 based on the decision made by the deciding unit 402. The controlling unit 403 can also request to the AP to provide the zone code.

The transmitting unit 404, in addition to transmitting information to the AP and the like, functions when the zone code is automatically configured. After the handover of the MN, the transmitting unit 404 transmits to the AP the information on the strength at the AP before the handover and the information on the prefix assigned to the AR to which the AP is connected. The storage unit 405 stores therein received information, such as the information on the prefix and the information on the strength, and stores information required to control operation of the MN, such as a control program.

Figure 11:
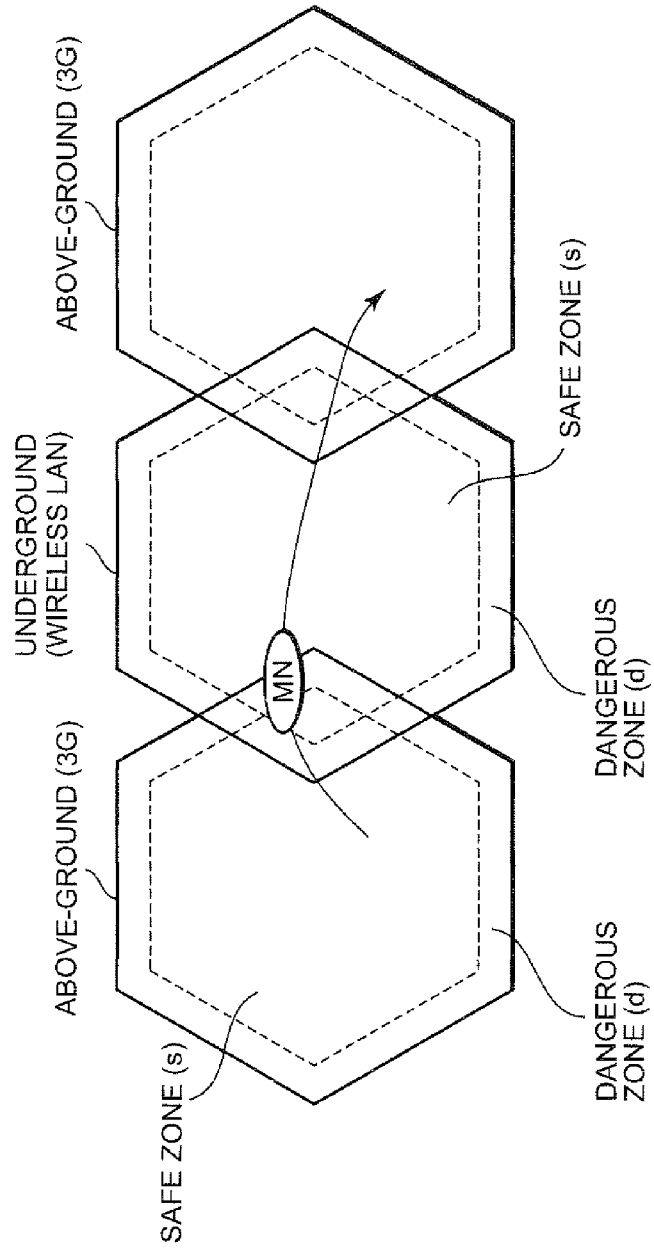
FIG. 11 is a diagram of an example of a configuration of another communication network according to the first and second embodiments of the present invention.

According to the first embodiment and the second embodiment, it is described about examples of areas configured by AP using the same link technology. However, the source AP (i.e. connected by the mobile terminal before handover) and the target AP (i.e. connected by the mobile terminal after handover) can use different link technologies. For example, as shown in FIG. 11, strengths obtained from respective AP of cellular system, such as 3rd Generation (3G) that covers above-ground areas, and a 802.11 wireless local area network (LAN) that covers some above-ground areas and underground areas (underground markets) can be used as the trigger for the handover. In other words, the MN starts the handover to the wireless LAN when the MN recognizes that the MN is in a dangerous zone(d) of the 3G.

Third Embodiment

According to the above-described embodiments, a handover of a MN in an environment (area configured by AP using the same link technology) in which sub-networks overlap in a layer 3 is described. Hereafter, three handover cases performed between different networks and/or domains will be described.

The first case will be described. The first instance is a handover between different access networks, such as a cellular network (also referred to, hereinafter, as simply cellular) and a wireless LAN (WLAN) (refer to IEEE 802.11 TGu contribution, 11-16-1848, Stephenson/O'hara, 13 Nov. 2006). For example, in a manner similar to that according to the above-described embodiments, the AP present at an edge of the WLAN notifies the MN that "the AP itself is positioned at the edge of the WLAN" by a beacon and the like. In a manner similar to that according to the above-described embodiments, a BS present at the edge of the cellular notifies the MN that "the BS itself is positioned at the edge of the cellular" by a beacon and the like. For example, this is equivalent to when the MN moves from an above-ground area (cellular) to an underground area (WLAN). As a result, the MN does not have to activate unnecessary wireless interface until the beacon is received. Wasteful power consumption can be prevented.

Figure 12:
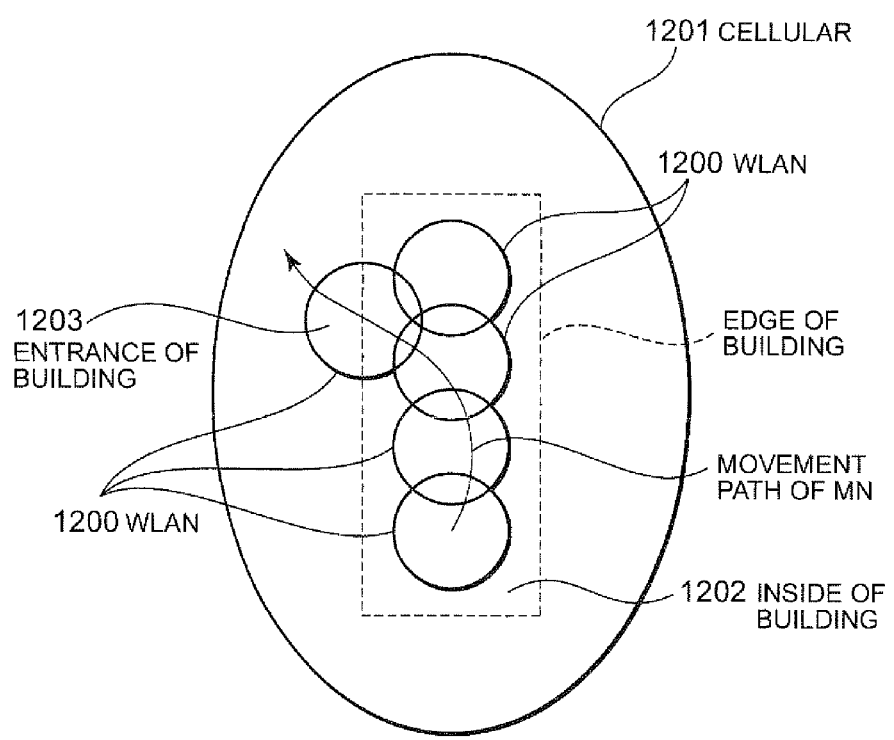
FIG. 12 is a diagram for explaining when the MN performs a handover from a cellular to a WLAN in relation to a handover in a first instance, according to a third embodiment of the present invention.

The first case will be described in detail with reference to FIG. 12. An example in FIG. 12 shows when the MN performs a handover from WLAN 1200 to cellular 1201. In this case, an AP positioned at the edge of the WLAN 1200 notifies the MN that "the AP itself is positioned at the edge of the WLAN 1200" by a beacon and the like. As shown in FIG. 12, the MN starts to move from inside of the building 1202 covered by the AP of the WLAN 1200. The MN passes through an entrance of the building 1203 and attempts to go outside. At this time, the AP of the WLAN 1200 gives a notification at the entrance of the building 1203 that "the AP itself is positioned at the edge" by a beacon.

When the MN receives the beacon through an interface with the WLAN 1200, the MN activates an interface with the cellular 1201 and starts scanning (search) for the cellular 1201. The MN selects the cellular 1201 that can be used and establishes a L2 link with the cellular 1201. Then, the MN performs a handover from the WLAN 1200 to the cellular 1201 in the L3 using, for example, a mobile IP or Monami6 (Mobile Nodes and Multiple Interfaces in IPv6). As a result, the MN moves away from the WLAN 1200 (WLAN area).

Figure 13:
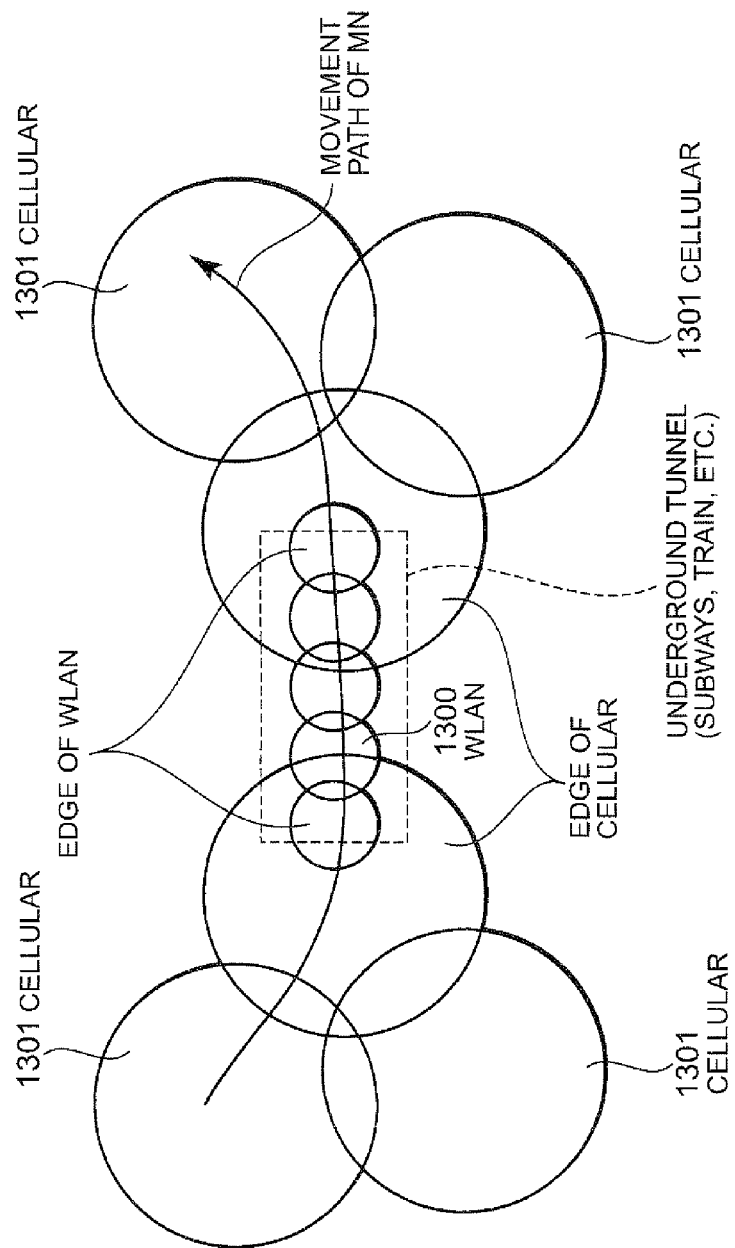
FIG. 13 is a diagram for explaining when the MN performs a handover from a cellular to a WLAN in relation to a handover in the first instance, according to the third embodiment of the present invention.

On the other hand, when the MN performs a handover from cellular 1301 to WLAN 1300 will be described with reference to FIG. 13. As shown in FIG. 13, an AP positioned on the edge of the WLAN 1300 notifies the MN that "the AP itself is positioned on the edge of the WLAN 1300" by a beacon. The BS positioned on the edge of the cellular 1301 notifies the MN that "the BS itself is positioned on the edge of the cellular 1301" by a beacon. Here, the MN starts to move from within the cellular 1301. The MN then reaches the edge of the cellular 1301. At this time, the BS of the cellular 1301 notifies the MN that "the BS itself is positioned on the edge of the cellular 1301" by a beacon.

The MN receives the beacon through an interface with the cellular 1301, and activates an interface with the WLAN 1300. The MN starts scanning (search) for the WLAN 1300. The MN selects the WLAN 1300 that can be used and establishes a L2 link with the WLAN 1300. Then, the MN performs a handover from the cellular 1301 to the WLAN 1300 in the L3 using, for example, a mobile IP or Monami6. As a result, the MN moves away from the cellular 1301 (cellular area).

Next, the second case will be described. The second case is a handover between different mobility management domains, such as between a PMIP domain and a CMIP domain. As a result, when the MN moves from PMIP to CMIP, the MN can start proactive procedures in the MIP, such as proactive procedures in FMIP and prediction mode in context transfer protocol.

Figure 14:
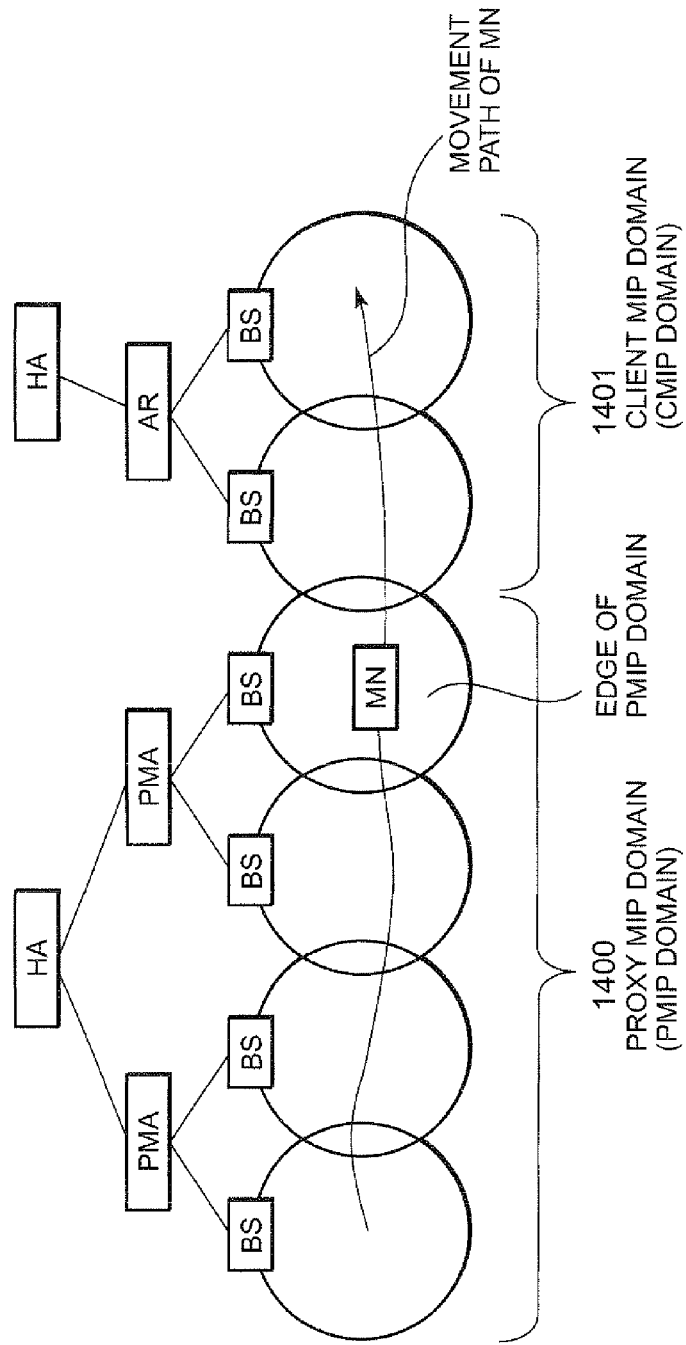
FIG. 14 is a diagram for explaining the handover in a second instance according to the third embodiment of the preset invention.

Details are described with reference to FIG. 14. As shown in FIG. 14, the MN starts movement from a PMIP domain 1400. When the MN moves to the edge of the PMIP domain 1400, the MN receives a beacon from a BS stating "the BS itself is positioned at the edge". The MN proactively performs bootstrapping on a HA in a CMIP domain 1401. Context is then transferred from a HA in the PMIP domain 1400. A PMA here can be said as a local mobility anchor (LMA) or a mobile access gateway (MAG). In IEEE 802.21, the BS and the AP are equivalent to point of attachment (PoA).

Figure 15:
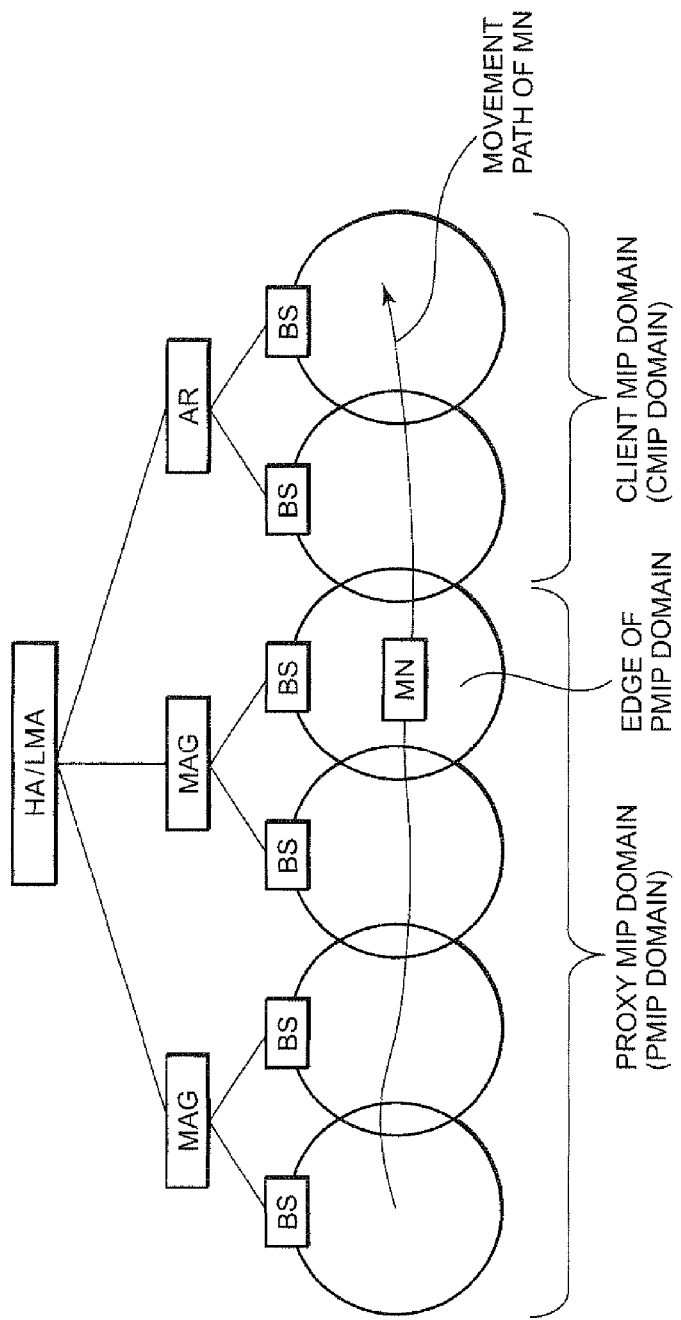
FIG. 15 is a diagram of an example of a communication network other than a communication network in the second instance according to the third embodiment of the present invention.

The network configuration shown in FIG. 14 is an example. Other network configurations can also be considered. Two network configurations are hereafter described. A first configuration is an instance in which the LMA of the PMIP and the HA of the CMIP are disposed together, as shown in FIG. 15. In this instance as well, when the MN moves and is, for example, positioned on the edge of the PMIP domain, the MN receives the beacon from a BS stating "the BS itself is positioned at the edge". As a result, the MN performs the HO processing. In IEEE 802.21, the AP and the BS are equivalent to the PoA.

Figure 16:
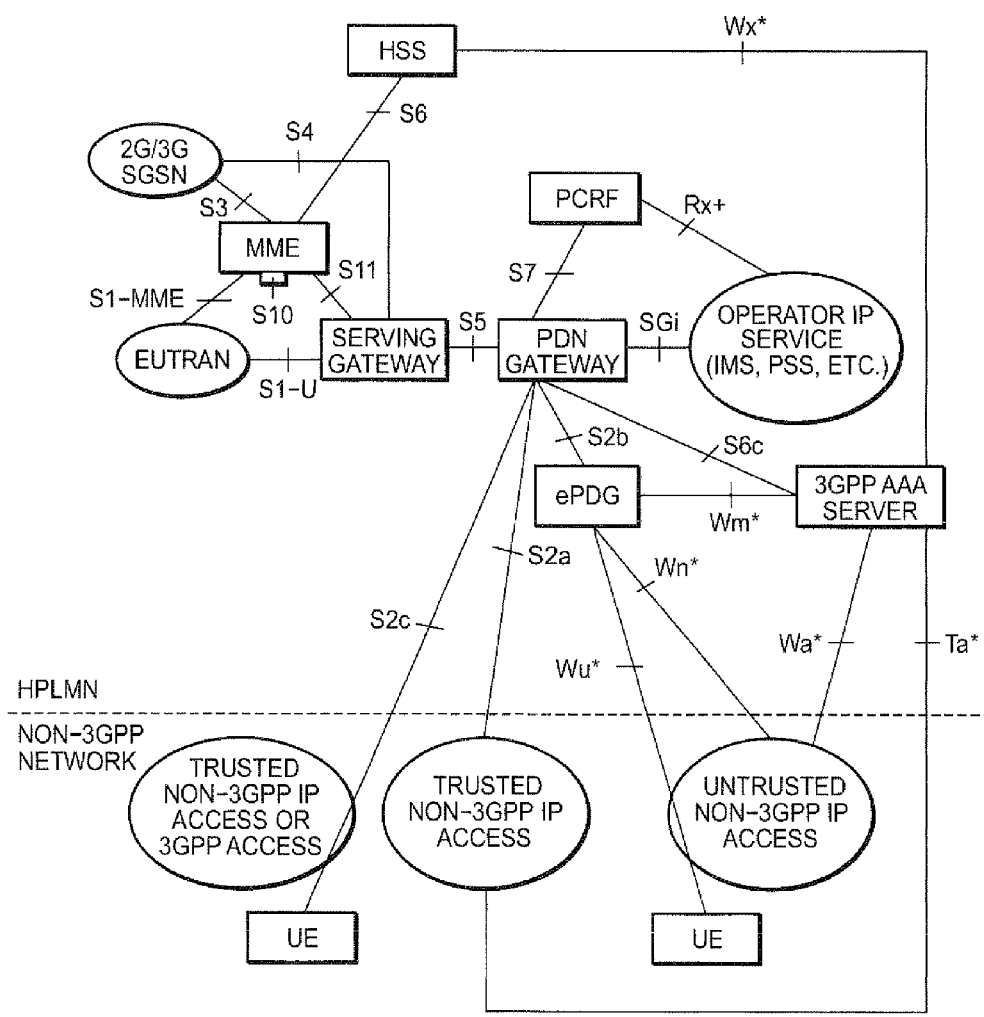
FIG. 16 is a diagram of an example of a communication network configured by a HPLMN and a Non-3GPP network corresponding to the communication network in FIG. 15.

Constituent elements of the network configuration shown in FIG. 15 correspond to respective constituent elements of network configurations configured in a home public land mobile network (HPLMN) and a Non-3GPP network shown in FIG. 16. In other words, PDN GW, UE and ePDG shown in FIG. 16 are respectively equivalent to HA/LMA, MN and MAG shown in FIG. 15. The MAG is positioned on an inner side of a trusted Non-3GPP IP access.

Figure 17:
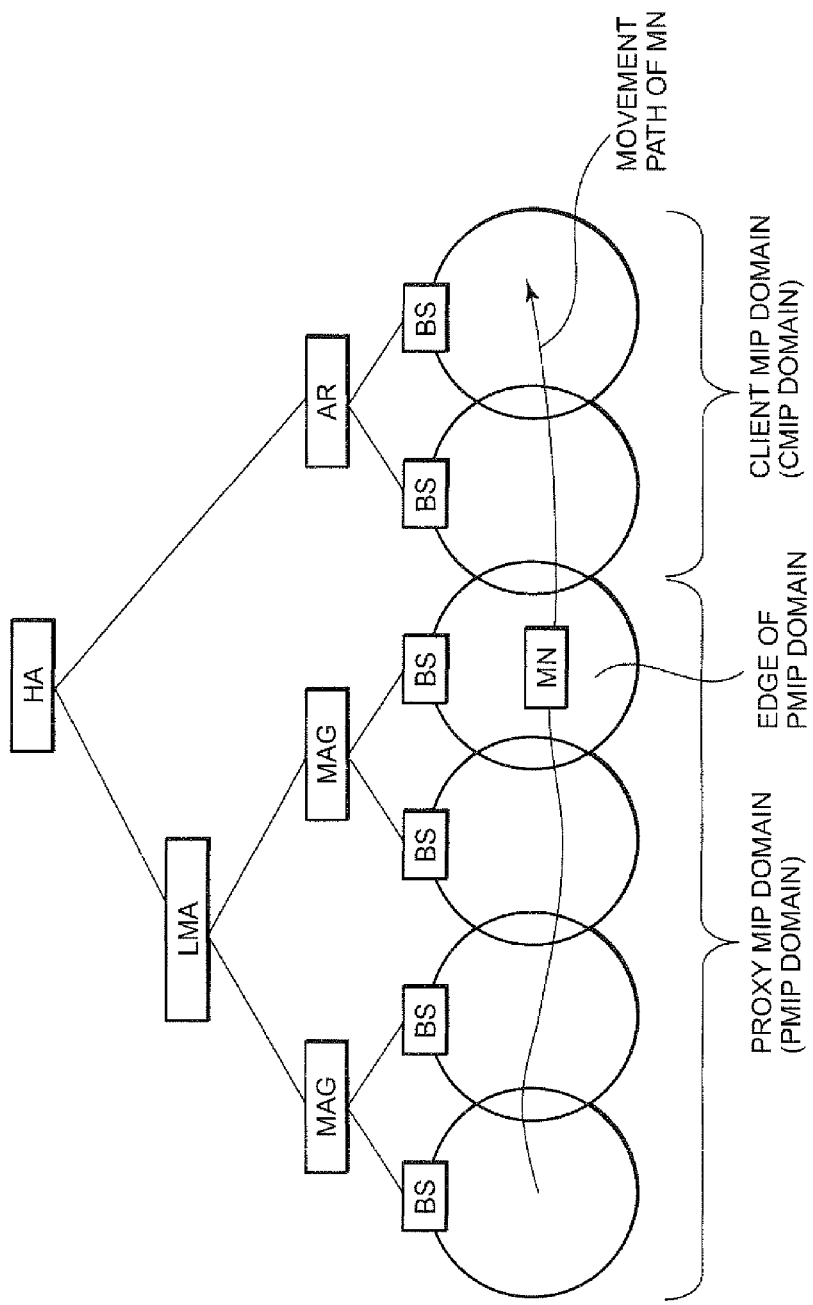
FIG. 17 is a diagram of an example of a communication network other than the communication network in the second instance according to the third embodiment of the present invention.

A second configuration is an instance in which the LMA of the PMIP is under the control of the HA of the CMIP, as shown in FIG. 17. In this instance as well, when the MN moves and is, for example, positioned on the edge of the PMIP domain, the MN receives the beacon from a BS stating "the BS itself is positioned at the edge". As a result, the MN performs the HO processing. In IEEE 802.21, the AP and the BS are equivalent to the PoA.

Next, the third case of a handover performed by the MN between different networks and domains will be described. The third case is a handover performed between different management domains, such as that at a roaming border. As a result, the MN can start proactive procedures, such as advance authentication and network selection, and shorten handover time.

Figure 18:
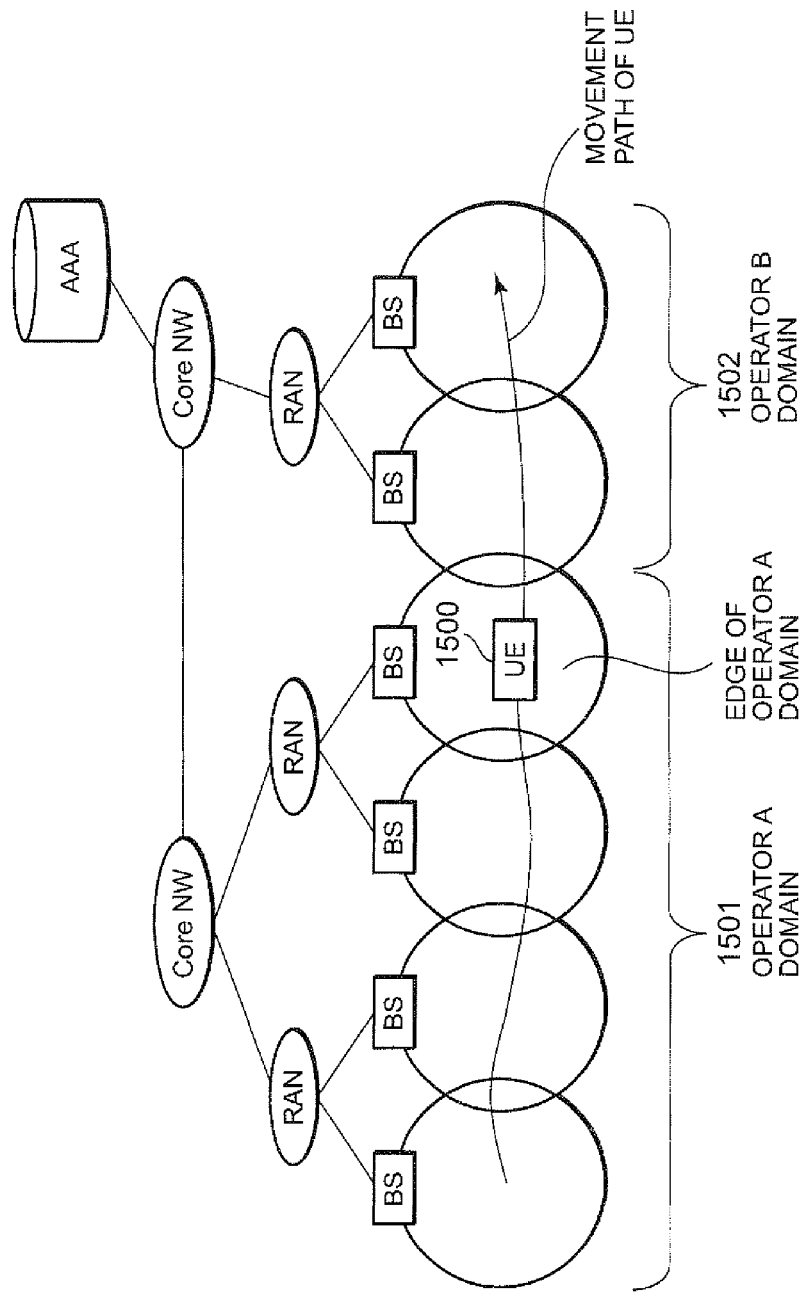
FIG. 18 is a diagram of an example of a handover in a third instance according to the third embodiment of the present invention.

Details are described with reference to FIG. 18. As shown in FIG. 18, a user equipment (UE) 1500 starts communication at a domain 1501 of an operator A. When the UE 1500 moves to the edge of the domain 1501 of the operator A, the UE 1500 receives a beacon from a BS stating "the BS itself is positioned at the edge". The UE 1500 performs authentication/ authorization in a domain 1502 of an operator B using an authentication, authorization, and accounting (AAA) server. Context is transferred.

Because the networks in the above-described three cases are larger than the sub-networks according to the first and second embodiments, the AR and the like can transmit the beacons. Any entity at higher layer than L3 can provide the beacons if it is possible and better rather than having L3 entities aggregated.

Figure 19:
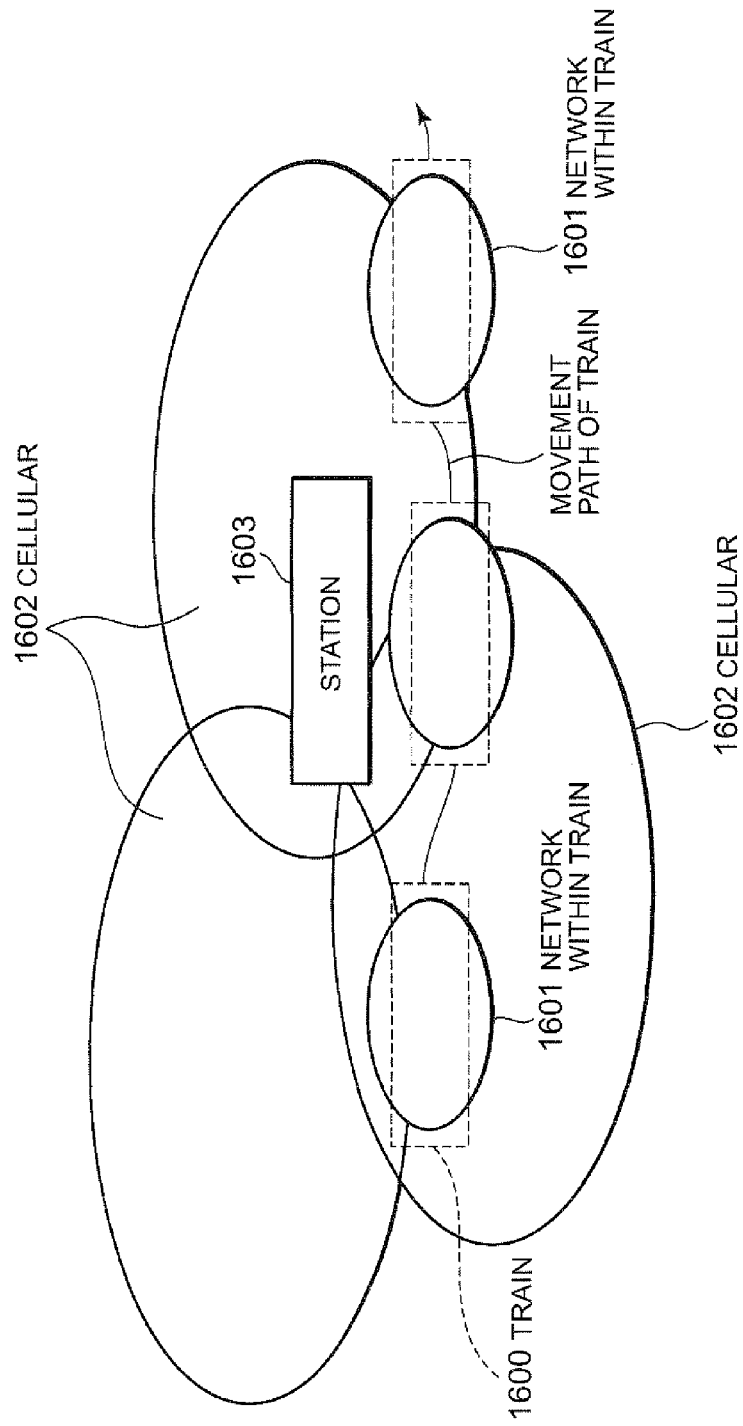
FIG. 19 is an explanatory diagram of a handover performed when a train approaches a station and when the train leaves the station according to the third embodiment of the present invention.

Here, yet another case rather than the above-described three cases will be described with reference to FIG. 19. A train on which a passenger having the MN is riding approaches a station, arrives at the station, and subsequently leaves the station. As shown in FIG. 19, a train 1600 transmits a beacon stating "the train 1600 itself is positioned at the edge". The MN interprets the beacon to mean that "the MN should search for another network because this network is unstable". When the train 1600 approaches (or arrives at) a station 1603, the MN of the passenger performs a handover from a network 1601 within the train 1600 to another network, such as a network on a platform of the station 1603, or a cellular 1602. Then, when the train 1600 leaves the station 1603, the MN performs a handover to the network 1601 within the train 1600. The MN is connected, for example, to the cellular 1602 until the MN stops receiving the beacon stating "the train 1600 itself is positioned at the edge" after leaving the station 1603.

It is possible for the beacon for providing notification of the edge (also applies to the beacon for providing notification of strength) to have any information from any layer, as described below. Various methods can be used for ground configuration and frequency of notification using the beacon. When the notification is performed at a communication layer, layer 2 notification information, beacons, and the like can be used. Alternatively, information notifications in layer 2.5 (IEEE 802.21 and the like) and the like can be used. Alternatively, layer 3 messages (router advertisements, DHCP messages, and the like) can be used. Alternatively, transport layer messages (such as that using NTLP in NSIS) can be used. Alternatively, application layer messages (such as that using NSLP in NSIS) can be used. As communication ground configuration for information notification, any of notification (broadcast) from a notification source, such as the BS/AP, recipient-restricted notification (multicast), and notification to a specific recipient (unicast) can be performed. Notification frequency can be a constant period. Alternatively, the notification frequency can be judged based on circumstances on the network end. Alternatively, the notification can be provided in response to a request from the MN/UE. In addition to the AR, the BS and the AP, the notification source can be an information server (an IS server in IEEE 802.21, a policy management server in a 3GPP network and the like).

According to each of the above-described embodiments, the HO processing is basically performed through reception of a beacon and the like from the edge of a connection destination. However, here, two instances in which HO control is performed on the network side (for example, a network-control-terminal or network-controller that controls a network) will be described. In a first instance, when an accurate position of a UE that is a mobile node is known by 3GPP operator, the network-control-terminal and the like notifies the UE that "the UE is in a dangerous state (a state that HO is required)" regardless of a communication range with the BS. The network-control-terminal can also notify the UE of the prefix at the next HO destination simultaneously with the notification of the dangerous state.

In a second instance, the network-control-terminal notifies the UE of a dangerous zone, such as that described above, regardless of the BS range. This instance is effective when a large number of UEs simultaneously perform HO in the L3 at same time (i.e. in a concentrated manner). For example, when a large number of UEs are moving by a train or the like, many L2 HO signals are generated during movement. However, when HO to the L3 simultaneously occurs in this state, the situation becomes serious. Therefore, concentrated generation of L2 and L3 HO signals can be prevented by timing of the L3 HO signals and of the L2 HO signals being shifted (arranged), and the timing also being shifted (arranged) among UEs.

Signaling (HO command) from the network-control-terminal indicating the dangerous zone can be performed by a broadcast method (or indicating only once). In this case, after the UE receives the command, the UE performs the actual HO after waiting an arbitrary period of time selected for each individual UE or by groups of UEs (such as a back off in random access). For groups of UEs, the HO command can be transmitted from the network-control-terminal to each group. The transmission of the HO command to the groups from the network-control-terminal can be performed for the groups during its movement as well. In this case, the HO command contains, for example, a group code and one or more ID of a terminal corresponding to the group code.

Figure 20:
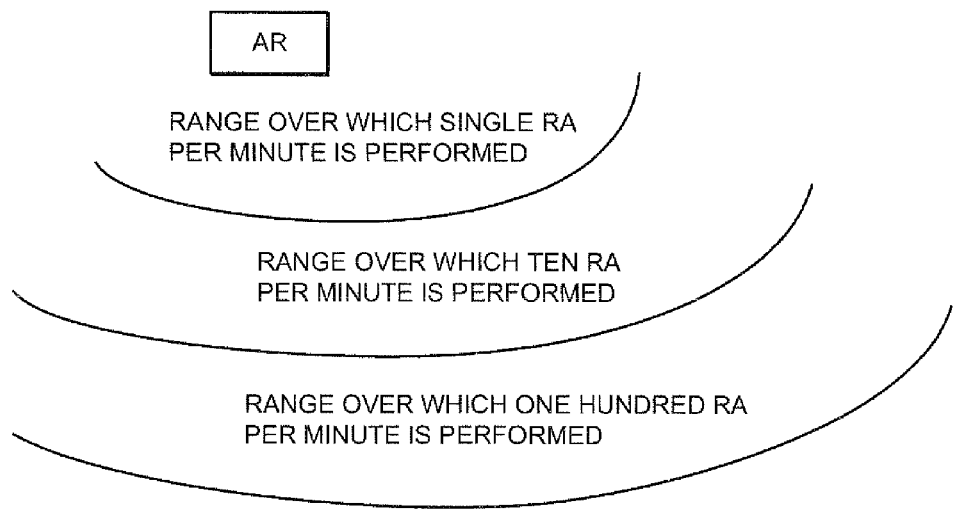
FIG. 20 is a diagram for explaining a method of expressing strength according to each embodiment of the present invention.
Figure 21:
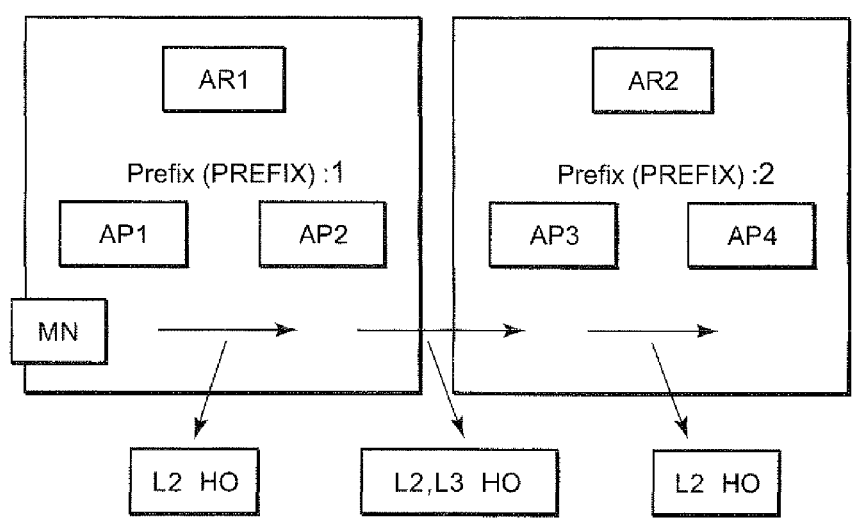
FIG. 21 is a diagram of a portion of a configuration of a conventional communication network.
Figure 22:
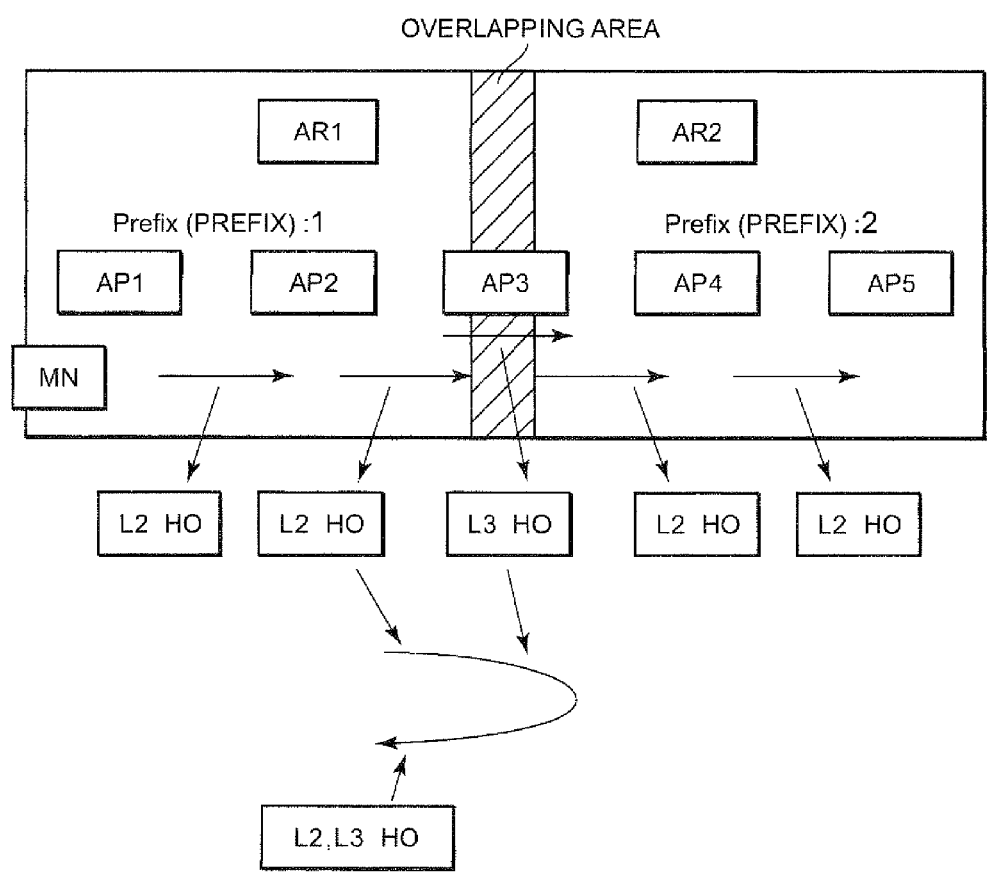
FIG. 22 is a diagram of a portion of a configuration of another conventional communication network.

Here, other methods for expression of the above-described strength will be further described. The strength is set to such as, for example, small value at the edge of the subnet of the AR and increasing towards the center of the subnet. On the other hand, the strength herein can be expressed, for example, by a number of RAs. In other words, as shown in FIG. 20, it is configured that the number of RAs per unit of time is changed at each predetermined range. In an example shown in FIG. 20, a configuration is applied like that the number of RAs per minute differs at each range. As a result, whether the UE is in the dangerous zone can be detected based on the number of RAs.

Further, the HO processing performed after the UE (MN) receives the RA is described above. However, here, other HO processing performed by the UE after receiving the RA will be described. When the UE receives the RA, the UE checks the content of the received RA. When predetermined information is included, the UE makes an inquiry to, for example, a predetermined server (an AAA server, an IS server, and the like) regarding the strength at this position. In addition to the above-described information included in the RA, the RA includes information instructing the UE to inquire the predetermined server of the strength. The information for instruction is, for example, added by the BS.

The predetermined server also transmits a value of the prefix in response to the inquiry from the UE, in addition to the information on the strength of the UE which was inquired in the coverage of the relevant AR by the UE. The information on the strength transmitted at this time is, for example, "30% at cover area A, and 70% at cover area B". The cover area A refers to an area covering the current position of the UE. In this example, the cover area A and the cover area B overlap, and the cover area B has higher value of the strength in the overlapped area. The communication between the MN and the predetermined server (AAA server and the like) is performed by, for example, MIH-IS or IP signals.

Moreover, as a variation of the edge according to each of the above-described embodiments, for example, a border between IPv6 and IPv4 can be used (in this case, HO processing by, for example, DSMIP can be performed before crossing an edge border). Alternatively, for example, a border between the Internet and an intranet can be used (in this case, HO processing can be performed using a new anchor, such as a shared GW before and after the border).

Each functional block used in the explanations of each embodiment of the present embodiment, described above, can be realized as a large scale integration (LSI) that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the integrated circuit (IC), a system LSI, a super LSI, or an ultra LSI. The method of forming the integrated circuit is not limited to LSI and can be actualized by a dedicated circuit or a general-purpose processor. A field programmable gate array (FPGA) that can be programmed after LSI manufacturing or a reconfigurable processor of which connections and settings of the circuit cells within the LSI can be reconfigured can be used. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

The handover processing method, and the access point and the mobile terminal used in the method of the present invention can prevent processing of HO in the L2 and HO in the L3 from occurring at same time simultaneously, and can shorten waiting time caused by the HO. Therefore, the present invention can be advantageously used in a handover processing method, and an access point and a mobile terminal used in the method, in which the handover processing method, and the access point and the mobile terminal used in the method is used when a mobile terminal moves within an area configured by a plurality of access routers that each forms a subnet and to which access points are connected, the access points providing unique areas in which communication can be performed.

The invention claimed is:

1. A handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with an access point within a communication area, switches connection from the access point with which communication is currently being performed to another access point as a result of movement, the handover processing method comprising steps of:
providing, by the access point, strength information held by the access point itself, the strength information being information promoting handover processing in a layer 3 or information not promoting the handover processing in the layer 3, and being set to a predetermined uniform value within the communication area; and
receiving, by the mobile node, the provided strength information, deciding whether to perform a handover in the layer 3 based on the received strength information, and performing the handover processing in the layer 3 based on the decision.

2. The handover processing method according to claim 1, wherein the access point provides the strength information in response to a request from the mobile node.

3. The handover processing method according to claim 1, wherein:
the mobile node, after the connection to the access point is switched, transmits to the other access point the strength information at the access point before the switch and prefix information assigned to an access router to which the access point is connected; and
the other access point generates new strength information based on the received strength information and prefix information.

4. The handover processing method according to claim 3, wherein a timing at which the strength information and the prefix information are transmitted is indicated by the access router.

5. The handover processing method according to claim 1, wherein the strength information is information set in advance.

6. A handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with an access point within a communication area, switches connection from the access point with which communication is currently being performed to another access point as a result of movement, the handover processing method comprising steps of:
receiving, by the mobile node, a predetermined message transmitted from an external source and, when the received predetermined message includes a predetermined piece of information, making an acquisition request to a predetermined server to acquire strength information serving as a judgment basis for handover processing in a layer 3, and being set to a predetermined uniform value within the communication area;
transmitting, by the predetermined server, the strength information to the mobile node in response to the acquisition request; and
deciding, by the mobile node, whether to perform a handover in the layer 3 based on the strength information, and performing the handover processing in the layer 3 based on the deciding.

7. A handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communicate with a correspondent node through wireless access with an access point within a communication area, switches connection from the access point with which communication is currently being performed to another access point as a result of movement, the handover processing method comprising steps of:
providing, by a control terminal controlling the communication network, strength information being information promoting handover processing in a layer 3 or information not promoting the handover processing in the layer 3, and being set to a predetermined uniform value within the communication area; and receiving, by the mobile node, the provided strength information, deciding whether to perform a handover in the layer 3 based on the received strength information, and performing the handover processing in the layer 3 based on the decision.

8. An access point in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, a mobile node, configured to communication with a correspondent node through wireless access with an access point within a communication area, switches connection from the access point with which communication is currently being performed to another access point as a result of movement, the access point comprising:

a storage unit that stores therein strength information being information promoting handover processing in a layer 3 or information not promoting the handover processing in the layer 3, and being set to a predetermined uniform value within the communication area; and a providing unit that provides the stored strength information.

9. The access point according to claim 8, wherein the providing unit provides the strength information in response to a request from the mobile node.

10. The access point according to claim 8, further comprising:

a receiving unit that receives from the mobile node, after the connection to the access point is switched, the strength information at the access point before switching and prefix information assigned to an access router to which the access point is connected; and a generating unit that generates new strength information based on the received strength information and prefix information.

11. The access point according to claim 10, wherein a timing at which the strength information and the prefix information are transmitted is indicated by the access router.

12. The access point according to claim 8, wherein the strength information is information set in advance.

13. A mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with an access point within a communication area, switches connection from the access point with which communication is currently being performed to another access point as a result of movement, the mobile node comprising:

a receiving unit that receives strength information provided by the access point and held by the access point, the strength info illation being information promoting a handover processing in layer 3 or information not promoting the handover processing in the layer 3, and being set to a predetermined uniform value within the communication area;

a deciding unit that decides whether to perform a handover in the layer 3 based on the received strength information; and a controlling unit that performs the handover processing in the layer 3 based on the decision.

14. The mobile node according to claim 13, wherein the controlling unit requests that the access point provides the strength information.

15. The mobile node according to claim 13, further comprising:

a transmitting unit that transmits to the access point, after the connection to the access point is switched, the strength information at the access point before switching and prefix information assigned to an access router to which the access point is connected.

16. The mobile node according to claim 15, wherein a timing at which the strength information and the prefix information are transmitted is indicated by the access router.

17. The mobile node according to claim 13, wherein the strength information is set in advance.

18. A mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with an access point within a communication area, switches connection from the access point with which communication is currently being performed to another access point as a result of movement, the mobile node comprising:

a receiving unit that receives a predetermined message transmitted form an external source;

a transmitting unit that, when the received predetermined message includes a predetermined piece of information, makes an acquisition request to a predetermined server to acquire strength information serving as a judgment basis for handover processing in a layer 3, and being set to a predetermined uniform value within the communication area;

a deciding unit that decides whether to perform a handover in the layer 3 based on the strength information from the predetermined server; and a controlling unit that performs the handover processing in the layer 3 based on the decision.

19. A mobile node in a handover processing method in which, in a communication system in which a plurality of access routers each configuring a subnet are connected via a communication network, at least one or more access points providing unique communication areas are connected to each of the plurality of access routers, and respective subnets of the plurality of access routers are configured to overlap with one another, the mobile node, configured to communicate with a correspondent node through wireless access with an access point within a communication area, switches connection from the access point with which communication is currently being performed to another access point as a result of movement, the mobile node comprising:

a receiving unit that receives strength information provided by a control terminal controlling the communication network, the strength information being information promoting handover processing in a layer 3 or information not promoting the handover processing in the layer 3, and being set to a predetermined uniform value within the communication area;

a deciding unit that decides whether to perform a handover in the layer 3 based on the received strength information; and a controlling unit that performs the handover processing in the layer 3 based on the decision.

20. The handover processing method according to claim 1, wherein an access point connected to the plurality of access routers provides a plurality of the strength information associated with each of the plurality of access routers, the strength information being set based on a location of the access point within each of the subnets configured by each of the access routers.

21. The access point according to claim 8, wherein an access point connected to the plurality of access routers provides a plurality of the strength information associated with each of the plurality of access routers, the strength information being set based on a location of the access point within each of the subnets configured by each of the access routers.

22. The mobile node according to claim 13, wherein the access point connected to the plurality of access routers provides a plurality of the strength information associated with each of the plurality of access routers, the strength information being set based on a location of the access point within each of the subnets configured by each of the access routers.

* * * * *

UNITED STATES PATENT AND TRADEMARK OFFICE
CERTIFICATE OF CORRECTION

PATENT NO. : 8,396,036 B2  
APPLICATION NO. : 12/439122  
DATED : March 12, 2013  
INVENTOR(S) : Aramaki et al.

Page 1 of 1

It is certified that error appears in the above-identified patent and that said Letters Patent is hereby corrected as shown below:

On Title Page 2, Item [56] References Cited, Other Publications, column 2, line 2, delete "Network Working Group, RFC 4080, Jun. 2005, pp. 1-49. p. 4, line 1."

and insert

--Network Working Group, RFC 4080, Jun. 2005, pp. 1-49.--.

In the Claims

Claim 13, column 21, line 63, delete

"strength info illation being information promoting a"

and insert

--strength information being information promoting a--.

Signed and Sealed this  
Eighth Day of April, 2014

Michelle K. Lee  
*Deputy Director of the United States Patent and Trademark Office*